United States Patent
Bhattad et al.

(10) Patent No.: US 11,330,555 B2
(45) Date of Patent: May 10, 2022

(54) MANAGING PAGING MONITORING BY A WIRELESS DEVICE

(71) Applicant: QUALCOMM Incorporated, San Diego, CA (US)

(72) Inventors: Kapil Bhattad, Bangalore (IN); Pravjyot Singh Deogun, Bangalore (IN); Rajeev Kumar, Bangalore (IN); Ozcan Ozturk, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/907,095

(22) Filed: Jun. 19, 2020

(65) Prior Publication Data

US 2021/0022110 A1    Jan. 21, 2021

(51) Int. Cl.
*H04W 68/02*      (2009.01)
*H04W 72/04*      (2009.01)

(52) U.S. Cl.
CPC ......... *H04W 68/02* (2013.01); *H04W 72/042* (2013.01)

(58) Field of Classification Search
CPC ............................ H04W 68/02; H04W 72/042
See application file for complete search history.

(56) References Cited

U.S. PATENT DOCUMENTS

2018/0026698 A1*  1/2018  Lee ..................... H04B 7/2125
                                                  370/335
2019/0394749 A1*  12/2019  Islam .................. H04W 56/001
(Continued)

FOREIGN PATENT DOCUMENTS

| EP | 3681213 A1 | 7/2020 |
|---|---|---|
| WO | 2018144873 A1 | 8/2018 |
| WO | 2019062779 A1 | 4/2019 |

OTHER PUBLICATIONS

Fujitsu: "Additional Paging Opportunities for NR-U", 3GPP Draft, 3GPP TSG-RAN WG2 Meeting#106, R2-1906252 Additional Paging Opportunities for NR-U, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2019-May 17, 2019 May 13, 2019 (May 13, 2019), XP051729722, 6 Pages, Retrieved from the Internet: URL:http://www.3gpp.org/ftp/Meetings%5F3GPP%5FSYNC/RAN2/Docs/R2%2D1906252%2Ezip. [retrieved on May 13, 2019] sections 1-3.
(Continued)

*Primary Examiner* — Barry W Taylor
(74) *Attorney, Agent, or Firm* — The Marbury Law Group/Qualcomm

(57) ABSTRACT

This disclosure provides systems, methods and apparatus, and computer programs encoded on computer storage media, for managing paging monitoring by a wireless device. In one aspect, the wireless device may receive a serving cell signal from a cell. The wireless device may determine a delay time based on the serving cell signal. The wireless device may monitor for the paging signal during the determined delay time. The wireless device may stop the monitoring for the paging signal upon or after expiration of the determined delay time. In some aspects, the wireless device may receive an indication of multiple paging signal monitoring occasions from the cell, which may include an indication of a number of synchronization signal blocks (SSBs) to be transmitted from the cell and a number of physical downlink control channel (PDCCH) monitoring occasions per SSB in a paging occasion.

34 Claims, 25 Drawing Sheets

(56) References Cited

U.S. PATENT DOCUMENTS

| | | | | |
|---|---|---|---|---|
| 2020/0280959 A1* | 9/2020 | Sharma | ............ | H04W 52/0235 |
| 2020/0404617 A1* | 12/2020 | Murray | ............ | H04W 52/0229 |
| 2021/0185652 A1* | 6/2021 | Rune | .................. | H04W 72/042 |

OTHER PUBLICATIONS

International Search Report and Written Opinion—PCT/US2020/038905—ISA/EPO—dated Sep. 3, 2020.

Huawei, et al., "Enhancement to Initial Access in NR Unlicensed", 3GPP Draft, 3GPP TSG RAN WG1 Meeting #97, R1-1906045, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019, XP051727502, 14 pages, Retrieved from the Internet: URL: http://www.3gpp.org/ftp/Meetings%5F3GPP%5FSYNC/RAN1/Docs/R1%2D1906045%2Ezip , [retrieved on May 13, 2019] section 3.1, 1-6, first line, p. 6, paragraph [0005].

\* cited by examiner

MANAGING PAGING MONITORING BY A WIRELESS DEVICE

RELATED APPLICATIONS

This application claims the benefit of priority to India Provisional Application No. 201941028779 entitled "Managing Paging Monitoring By A Wireless Device" filed Jul. 17, 2019, the entire contents of which are hereby incorporated by reference for all purposes.

TECHNICAL FIELD

This disclosure relates generally to wireless devices, and more particularly to managing wireless devices to reduce power consumption by a wireless device while increasing wireless device performance in monitoring for broadcast signals such as paging messages.

DESCRIPTION OF THE RELATED TECHNOLOGY

Devices using 5G New Radio (NR) technology may use unlicensed spectrum, such as in the 5 GHz and 6 GHz frequency bands. Devices utilizing unlicensed spectrum are typically required to perform a Listen-Before-Talk (LBT) procedure before transmitting on a channel to determine whether other devices are transmitting on the channel. For certain broadcast signals, such as paging messages from a wireless base station, the LBT procedure requirement may decrease the probability that such broadcast signals are received successfully by a target device. To address this problem, wireless devices may be configured to monitor for paging messages for an increased amount of time or during a greater number of monitoring opportunities, for example, increasing a number of Physical Downlink Control Channel (PDCCH) monitoring occasions for a given paging occasion. However, monitoring for broadcast signals for substantially more time increases the power consumption by the wireless device.

SUMMARY

The systems, methods and devices of this disclosure each have several innovative aspects, no single one of which is solely responsible for the desirable attributes disclosed herein.

One innovative aspect of the subject matter described in this disclosure may be implemented in a wireless device. Some implementations may include receiving a serving cell signal from a cell, determining a delay time based on the serving cell signal, monitoring for a paging signal during the determined delay time, and stopping the monitoring for the paging signal upon or after expiration of the determined delay time.

In some implementations, receiving the serving cell signal from the cell may include receiving an indication of multiple paging signal monitoring occasions from the cell. In such implementations, receiving the indication of multiple paging signal monitoring occasions from the cell may include receiving an indication from the cell of a number of synchronization signal blocks (SSBs) to be transmitted from the cell and a number of physical downlink control channel (PDCCH) monitoring occasions per SSB in a paging occasion.

In some implementations, determining the delay time based on the serving cell signal may include determining a number of paging signal monitoring occasions based on the serving cell signal, and determining the delay time based on the determined number of paging signal monitoring occasions. In some implementations, determining the delay time based on the serving cell signal may include selecting, based on the serving cell signal, a number of paging signal monitoring occasions, and determining the delay time based on the selected number of paging signal monitoring occasions. In some implementations, determining a delay time based on the serving cell signal may include identifying a type of serving cell signal received from the cell, and determining the delay time based on the type of serving cell signal.

In some implementations, determining the delay time based on the serving cell signal may include determining that the serving cell signal includes paging control information, and determining the delay time based on the determination that the serving cell signal includes paging control information. In some implementations, determining the delay time based on the serving cell signal may include determining that the serving cell signal includes channel occupancy time (COT) structure indicator, and determining the delay time based on the determination that the serving cell signal includes the COT structure indicator. In some implementations, determining the delay time based on the determination that the serving cell signal includes the COT structure indicator may include determining whether an overlap of a remaining COT duration with a paging occasion is less than a threshold, determining that the delay time includes an end of the paging occasion in response to determining that the overlap is less than the threshold, and determining that the delay time includes at most the remaining COT duration in response to determining that the overlap is not less than the threshold.

In some implementations, determining the delay time based on the serving cell signal may include determining based on the COT structure indicator that a paging occasion overlaps with an uplink burst, determining that the COT structure indicator does not indicate a downlink burst, and determining the delay time based on a duration of the paging occasion. In some implementations, determining the delay time based on the serving cell signal may include determining based on the COT structure indicator that a paging occasion overlaps with an uplink burst, and determining the delay time based on a first paging signal monitoring occasion that overlaps with a downlink burst indicated in the COT structure indicator. In some implementations, determining the delay time based on the serving cell signal may include determining based on the COT structure indicator that a paging occasion overlaps with an uplink burst, and determining that the delay time is substantially zero in response to determining that the paging occasion overlaps with the uplink burst.

In some implementations, determining the delay time based on the determination that the serving cell signal includes the COT structure indicator may include determining whether the COT structure indicator is received during a SSB-based measurement timing configuration duration, determining whether overlap of a downlink burst duration or channel occupancy duration with the SSB-based measurement timing configuration duration indicated in the COT structure indicator is less than a threshold, and determining that the delay time includes a remainder of a paging occasion in response to determining that overlap of the downlink burst duration or channel occupancy duration with the SSB-based measurement timing configuration duration is less than the threshold. In some implementations, determining the delay time based on the determination that the serving cell signal includes the COT structure indicator may include determining whether the COT structure indicator is received during a SSB-based measurement timing configuration duration, and determining the delay time based on a number of paging signal monitoring occasions that to not overlap with the SSB-based measurement timing configuration duration. In some implementations, determining the delay time based on the determination that the serving cell signal includes the COT structure indicator may include determining whether the COT structure indicator is received during a SSB-based measurement timing configuration duration, and determining the delay time based on a number of paging signal monitoring occasions that occur after a synchronization sequences burst.

In some implementations, determining the delay time based on the determination that the serving cell signal includes the COT structure indicator may include determining whether a paging occasion overlaps with at least one of an uplink burst duration, a pause duration, or a flexible slot duration for greater than a threshold, and determining that the delay time is substantially zero in response to determining that the overlap is greater than the threshold. In some implementations, determining the delay time based on the determination that the serving cell signal includes the COT structure indicator may include determining whether the COT structure indicator is received during a SSB-based measurement timing configuration duration, and determining the delay time based on a number of paging signal monitoring occasions that do not overlap with symbols of SSB occasions of the SSB-based measurement timing configuration duration.

Another innovative aspect of the subject matter described in this disclosure can be implemented in an apparatus of a wireless device. Some implementations may include a first interface configured to obtain a serving cell signal from a cell, and a processing system coupled to the first interface and configured to determine a delay time based on the serving cell signal, monitor for a paging signal during the determined delay time, and stop the monitoring for the paging signal upon or after expiration of the determined delay time. In some implementations, the first interface may be further configured to obtain an indication of multiple paging signal monitoring occasions from the cell. In some implementations, the processing system may be further configured to receive an indication from the cell of a number of synchronization signal blocks (SSBs) to be transmitted from the cell and a number of physical downlink control channel (PDCCH) monitoring occasions per SSB in a paging occasion.

In some implementations, the processing system may be further configured to determine a number of paging signal monitoring occasions based on the serving cell signal, and determine the delay time based on the determined number of paging signal monitoring occasions. In some implementations, the processing system may be further configured to select, based on the serving cell signal, a number of paging signal monitoring occasions, and determine the delay time based on the selected number of paging signal monitoring occasions. In some implementations, the processing system may be further configured to identify a type of the serving cell signal received from the cell, and determine the delay time based on the type of the serving cell signal. In some implementations, the processing system may be further configured to determine that the serving cell signal includes paging control information, and determine the delay time based on the determination that the serving cell signal includes paging control information.

In some implementations, the processing system may be further configured to determine that the serving cell signal includes a channel occupancy time (COT) structure indicator, and determine the delay time based on the determination that the serving cell signal includes the COT structure indicator. In some implementations, the processing system may be further configured to determine whether an overlap of a remaining COT duration with a paging occasion is less than a threshold, and determine that the delay time includes an end of the paging occasion in response to determining that the overlap is less than the threshold, or determine that the delay time includes the remaining COT duration in response to determining that the overlap is not less than the threshold. In some implementations, the processing system may be further configured to determine based on the COT structure indicator that a paging occasion overlaps with an uplink burst, determine that the COT structure indicator does not indicate a downlink burst, and determine the delay time based on a duration of the paging occasion.

In some implementations, the processing system may be further configured to determine based on the COT structure indicator that a paging occasion overlaps with an uplink burst, and determine the delay time based on a first paging signal monitoring occasion that overlaps with a downlink burst indicated in the COT structure indicator. In some implementations, the processing system may be further configured to determine based on the COT structure indicator that a paging occasion overlaps with an uplink burst, and determine that the delay time is substantially zero in response to determining that the paging occasion overlaps with the uplink burst.

In some implementations, the processing system may be further configured to determine whether the COT structure indicator is received during a synchronization signal block (SSB)-based measurement timing configuration duration, determine whether overlap of a downlink burst duration or channel occupancy duration with the SSB-based measurement timing configuration duration indicated in the COT structure indicator is less than a threshold, and determine that the delay time includes a remainder of a paging occasion in response to determining that overlap of the downlink burst duration or channel occupancy duration with the SSB-based measurement timing configuration duration is less than the threshold.

In some implementations, the processing system may be further configured to determine whether the COT structure indicator is received during an SSB-based measurement timing configuration duration, and determine the delay time based on a number of paging signal monitoring occasions that to not overlap with the SSB-based measurement timing configuration duration. In some implementations, the processing system may be further configured to determine whether the COT structure indicator is received during an SSB-based measurement timing configuration duration, and determine the delay time based on a number of paging signal monitoring occasions that occur after a synchronization sequences burst.

In some implementations, the processing system may be further configured to determine whether a paging occasion overlaps with at least one of an uplink burst duration, a pause duration, or a flexible slot duration for greater than a threshold, and determine that the delay time is substantially zero in response to determining that the overlap is greater than the threshold. In some implementations, the processing system may be further configured to determine whether the COT structure indicator is received during a SSB-based measurement timing configuration duration, and determine the delay time based on a number of paging signal monitoring occasions that do not overlap with symbols of SSB occasions of the SSB-based measurement timing configuration duration.

Another innovative aspect of the subject matter described in this disclosure can be implemented in a non-transitory processor-readable medium having stored thereon processor-executable instructions configured to cause a wireless device processor to perform various operations, some implementations of which may include receiving a serving cell signal from a cell, determining a delay time based on the serving cell signal, monitoring for a paging signal during the determined delay time, and stopping the monitoring for the paging signal upon or after expiration of the determined delay time. In some implementations, the stored processor-executable instructions may be configured to cause the wireless device processor to perform operations such that receiving the serving cell signal from the cell includes receiving an indication of multiple paging signal monitoring occasions from the cell. In some implementations, the stored processor-executable instructions may be configured to cause the wireless device processor to perform operations such that receiving the indication of multiple paging signal monitoring occasions from the cell may include receiving an indication from the cell of a number of synchronization signal blocks (SSBs) to be transmitted from the cell and a number of physical downlink control channel (PDCCH) monitoring occasions per SSB in a paging occasion.

In some implementations, the stored processor-executable instructions may be configured to cause the wireless device processor to perform operations such that determining the delay time based on the serving cell signal may include determining a number of paging signal monitoring occasions based on the serving cell signal, and determining the delay time based on the determined number of paging signal monitoring occasions. In some implementations, the stored processor-executable instructions may be configured to cause the wireless device processor to perform operations such that determining the delay time based on the serving cell signal may include selecting, based on the serving cell signal, a number of paging signal monitoring occasions, and determining the delay time based on the selected number of paging signal monitoring occasions. In some implementations, the stored processor-executable instructions may be configured to cause the wireless device processor to perform operations such that determining the delay time based on the serving cell signal may include identifying a type of the serving cell signal received from the cell, and determining the delay time based on the type of the serving cell signal.

In some implementations, the stored processor-executable instructions may be configured to cause the wireless device processor to perform operations such that determining the delay time based on the serving cell signal may include determining that the serving cell signal includes paging control information, and determining the delay time based on the determination that the serving cell signal includes paging control information. In some implementations, the stored processor-executable instructions may be configured to cause the wireless device processor to perform operations such that determining the delay time based on the serving cell signal may include determining that the serving cell signal includes a channel occupancy time (COT) structure indicator, and determining the delay time based on the determination that the serving cell signal includes the COT structure indicator.

In some implementations, the stored processor-executable instructions may be configured to cause the wireless device processor to perform operations such that determining the delay time based on the determination that the serving cell signal includes the COT structure indicator may include determining whether an overlap of a remaining COT duration with a paging occasion is less than a threshold, and determining that the delay time includes an end of the paging occasion in response to determining that the overlap is less than the threshold, or determining that the delay time includes the remaining COT duration in response to determining that the overlap is not less than the threshold. In some implementations, the stored processor-executable instructions may be configured to cause the wireless device processor to perform operations such that determining the delay time based on the serving cell signal may include determining, based on the COT structure indicator, that a paging occasion overlaps with an uplink burst, determining that the COT structure indicator does not indicate a downlink burst, and determining the delay time based on a duration of the paging occasion.

In some implementations, the stored processor-executable instructions may be configured to cause the wireless device processor to perform operations such that determining the delay time based on the serving cell signal may include determining, based on the COT structure indicator, that a paging occasion overlaps with an uplink burst, and determining the delay time based on a first paging signal monitoring occasion that overlaps with a downlink burst indicated in the COT structure indicator. In some implementations, the stored processor-executable instructions may be configured to cause the wireless device processor to perform operations such that determining the delay time based on the serving cell signal may include determining, based on the COT structure indicator, that a paging occasion overlaps with an uplink burst, and determining that the delay time is substantially zero in response to determining that the paging occasion overlaps with the uplink burst.

In some implementations, the stored processor-executable instructions may be configured to cause the wireless device processor to perform operations such that determining the delay time based on the determination that the serving cell signal includes the COT structure indicator may include determining whether the COT structure indicator is received during a synchronization signal block (SSB)-based measurement timing configuration duration, determining whether overlap of a downlink burst duration or channel occupancy duration with the SSB-based measurement timing configuration duration indicated in the COT structure indicator is less than a threshold, and determining that the delay time includes a remainder of a paging occasion in response to determining that overlap of the downlink burst duration or channel occupancy duration with the SSB-based measurement timing configuration duration is less than the threshold.

In some implementations, the stored processor-executable instructions may be configured to cause the wireless device processor to perform operations such that determining the delay time based on the determination that the serving cell signal includes the COT structure indicator may include determining whether the COT structure indicator is received during a SSB-based measurement timing configuration duration, and determining the delay time based on a number of paging signal monitoring occasions that to not overlap with the SSB-based measurement timing configuration duration. In some implementations, the stored processor-executable instructions may be configured to cause the wireless device processor to perform operations such that determining the delay time based on the determination that the serving cell signal includes the COT structure indicator may include determining whether the COT structure indicator is received during a SSB-based measurement timing configuration duration, and determining the delay time based on a number of paging signal monitoring occasions that occur after a synchronization sequences burst.

In some implementations, the stored processor-executable instructions may be configured to cause the wireless device processor to perform operations such that determining the delay time based on the determination that the serving cell signal includes the COT structure indicator may include determining whether a paging occasion overlaps with at least one of an uplink burst duration, a pause duration, or a flexible slot duration for greater than a threshold, and determining that the delay time is substantially zero in response to determining that the overlap is greater than the threshold. In some implementations, the stored processor-executable instructions may be configured to cause the wireless device processor to perform operations such that determining the delay time based on the determination that the serving cell signal includes the COT structure indicator may include determining whether the COT structure indicator is received during an SSB-based measurement timing configuration duration, and determining the delay time based on a number of paging signal monitoring occasions that do not overlap with symbols of SSB occasions of the SSB-based measurement timing configuration duration.

Another innovative aspect of the subject matter described in this disclosure can be implemented in a wireless device. Some implementations may include means for receiving a serving cell signal from a cell, means for determining a delay time based on the serving cell signal, means for monitoring for a paging signal during the determined delay time, and means for stopping the monitoring for the paging signal upon or after expiration of the determined delay time. In some implementations, means for receiving the serving cell signal from the cell may include means for receiving an indication of multiple paging signal monitoring occasions from the cell. In some implementations, means for receiving the indication of multiple paging signal monitoring occasions from the cell may include means for receiving an indication from the cell of a number of synchronization signal blocks (SSBs) to be transmitted from the cell and a number of physical downlink control channel (PDCCH) monitoring occasions per SSB in a paging occasion.

In some implementations, means for determining the delay time based on the serving cell signal may include means for determining a number of paging signal monitoring occasions based on the serving cell signal, and means for determining the delay time based on the determined number of paging signal monitoring occasions. In some implementations, means for determining the delay time based on the serving cell signal may include means for selecting, based on the serving cell signal, a number of paging signal monitoring occasions, and means for determining the delay time based on the selected number of paging signal monitoring occasions. In some implementations, means for determining the delay time based on the serving cell signal may include means for identifying a type of the serving cell signal received from the cell, and means for determining the delay time based on the type of the serving cell signal.

In some implementations, means for determining the delay time based on the serving cell signal may include means for determining that the serving cell signal includes paging control information, and means for determining the delay time based on the determination that the serving cell signal includes paging control information. In some implementations, means for determining the delay time based on the serving cell signal may include means for determining that the serving cell signal includes a channel occupancy time (COT) structure indicator, and means for determining the delay time based on the determination that the serving cell signal includes the COT structure indicator. In some implementations, means for determining the delay time based on the determination that the serving cell signal includes the COT structure indicator may include means for determining whether an overlap of a remaining COT duration with a paging occasion is less than a threshold, and means for determining that the delay time includes an end of the paging occasion in response to determining that the overlap is less than the threshold, or means for determining that the delay time includes the remaining COT duration in response to determining that the overlap is not less than the threshold.

In some implementations, means for determining the delay time based on the serving cell signal may include means for determining, based on the COT structure indicator, that a paging occasion overlaps with an uplink burst, means for determining that the COT structure indicator does not indicate a downlink burst, and means for determining the delay time based on a duration of the paging occasion. In some implementations, means for determining the delay time based on the serving cell signal may include means for determining, based on the COT structure indicator, that a paging occasion overlaps with an uplink burst, and means for determining the delay time based on a first paging signal monitoring occasion that overlaps with a downlink burst indicated in the COT structure indicator. In some implementations, means for determining the delay time based on the serving cell signal may include means for determining, based on the COT structure indicator, that a paging occasion overlaps with an uplink burst, and means for determining that the delay time is substantially zero in response to determining that the paging occasion overlaps with the uplink burst.

In some implementations, means for determining the delay time based on the determination that the serving cell signal includes the COT structure indicator may include means for determining whether the COT structure indicator is received during a synchronization signal block (SSB)-based measurement timing configuration duration, means for determining whether overlap of a downlink burst duration or channel occupancy duration with the SSB-based measurement timing configuration duration indicated in the COT structure indicator is less than a threshold, and means for determining that the delay time includes a remainder of a paging occasion in response to determining that overlap of the downlink burst duration or channel occupancy duration with the SSB-based measurement timing configuration duration is less than the threshold.

In some implementations, means for determining the delay time based on the determination that the serving cell signal includes the COT structure indicator may include means for determining whether the COT structure indicator is received during an SSB-based measurement timing configuration duration, and means for determining the delay time based on a number of paging signal monitoring occasions that to not overlap with the SSB-based measurement timing configuration duration. In some implementations, means for determining the delay time based on the determination that the serving cell signal includes the COT structure indicator may include means for determining whether the COT structure indicator is received during an SSB-based measurement timing configuration duration, and means for determining the delay time based on a number of paging signal monitoring occasions that occur after a synchronization sequences burst.

In some implementations, means for determining the delay time based on the determination that the serving cell signal includes the COT structure indicator may include means for determining whether a paging occasion overlaps with at least one of an uplink burst duration, a pause duration, or a flexible slot duration for greater than a threshold, and means for determining that the delay time is substantially zero in response to determining that the overlap is greater than the threshold. In some implementations, means for determining the delay time based on the determination that the serving cell signal includes the COT structure indicator may include means for determining whether the COT structure indicator is received during a SSB-based measurement timing configuration duration, and means for determining the delay time based on a number of paging signal monitoring occasions that do not overlap with symbols of SSB occasions of the SSB-based measurement timing configuration duration.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
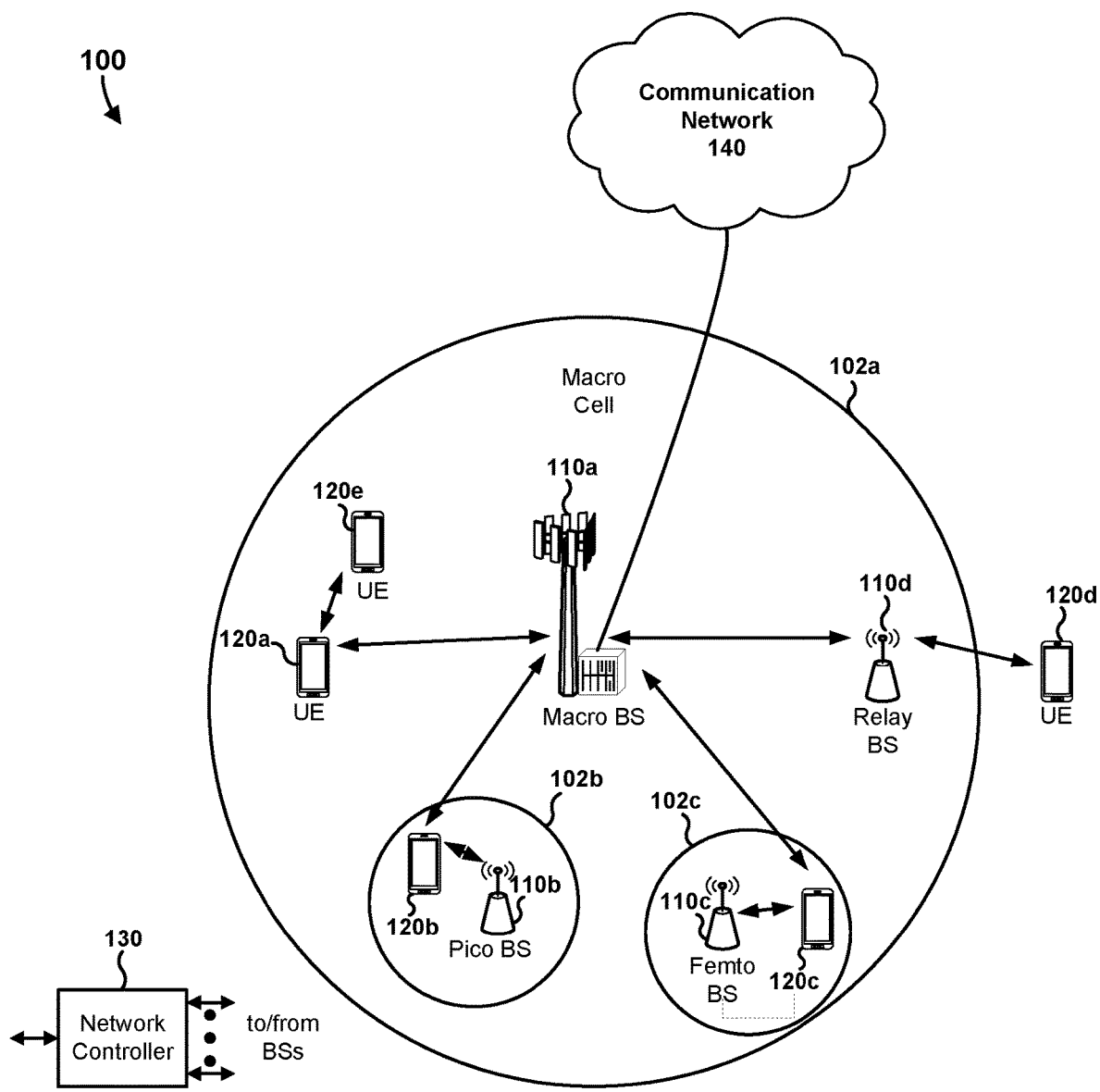
FIG. 1 shows a block diagram illustrating an example communication system.

The following description is directed to certain implementations for the purposes of describing the innovative aspects of this disclosure. However, a person having ordinary skill in the art will readily recognize that the teachings herein may be applied in a multitude of different ways.

The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other signals that are used to communicate within a wireless, cellular or Internet of Things (IoT) network, such as a system utilizing 3G, 4G, or 5G technology, or further implementations thereof.

The implementations described herein provide methods for managing wireless devices to potentially reduce their power consumption and thereby extend their operating duration on a single battery charge, while also potentially increasing the time during which the wireless device may monitor for broadcast signals from a base station, such as paging-related signaling. In some implementations, a wireless device can be enabled to perform a procedure for managing paging monitoring by monitoring signals from a cell of a communication network. In some implementations, the wireless device may receive a serving cell signal from the cell, and determine a delay time based on the serving cell signal. In some implementations, the wireless device may determine the delay time based on a variety of determinations. The wireless device may use the delay time for determining how long to continue monitoring for paging-related signaling, and for determining when the wireless device may stop monitoring for the paging-related signaling. In some implementations, the wireless device may continue monitoring for paging signals during the determined delay time. In some implementations, the wireless device may stop monitoring for paging signals upon or after expiration of the determined delay time.

In some implementations, the wireless device may determine a number of paging signal monitoring occasions based on the serving cell signal, and may determine the delay time based on the determined number of paging signal monitoring occasions. In some implementations, a paging signal monitoring occasion may be a PDCCH listening/decoding occasion. In some implementations, the wireless device may select, based on the serving cell signal, a number (including a predetermined number) of paging signal monitoring occasions, and may determine the delay time based on the selected number of paging signal monitoring occasions. In some implementations, the wireless device may determine the delay time based on a variety of determinations that are based on information in the serving cell signal.

Particular implementations of the subject matter described in this disclosure can be implemented to realize one or more of the following potential advantages. Various implementations may enable a wireless device to reduce power consumption while increasing operations for monitoring for paging-related signals. Various implementations also may provide improvements in the functioning of the wireless device as well as in the functioning of the communication system in which the wireless device operates. Aspects of this disclosure also may be utilized in other cellular operations like connected mode discontinuous reception (DRX) to potentially reduce power consumption of the user equipment (UE) while also potentially increasing the number of control channel transmission opportunities (TxOPs) for unlicensed channel access.

The term "wireless device" is used herein to refer to any one or all of wireless router devices, wireless appliances, cellular telephones, smartphones, portable computing devices, personal or mobile multi-media players, laptop computers, tablet computers, smartbooks, palmtop computers, wireless electronic mail receivers, multimedia Internet-enabled cellular telephones, wireless gaming controllers, wireless-network enabled Internet of Things (IoT) devices including large and small machinery and appliances for home or enterprise use, wireless communication elements within autonomous and semiautonomous vehicles, wireless devices affixed to or incorporated into various mobile platforms, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (such as a central processing unit (CPU) core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

FIG. 1 illustrates an example of a communications system 100 that is suitable for implementing various implementations. The communications system 100 may be a 5G NR network, or any other suitable network such as an LTE network.

The communications system 100 may include a heterogeneous network architecture that includes a communication network 140 and a variety of mobile devices (illustrated as wireless device 120a-120e in FIG. 1). The communications system 100 also may include a number of base stations (illustrated as the BS 110a, the BS 110b, the BS 110c, and the BS 110d) and other network entities. A base station is an entity that communicates with wireless devices (mobile devices), and also may be referred to as a NodeB, an LTE evolved NodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The communications system 100 also may include relay stations (such as relay BS 110d). A relay station is an entity that can receive a transmission of data from an upstream station (for example, a base station or a mobile device) and send a transmission of the data to a downstream station (for example, a wireless device or a base station). A relay station also may be a wireless device that can relay transmissions for other mobile devices. In the example illustrated in FIG. 1, a relay station 110d may communicate with the macro base station 110a and the wireless device 120d in order to facilitate communication between the macro base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts), whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The mobile devices 120a, 120b, 120c may be dispersed throughout communications system 100, and each wireless device may be stationary or mobile. A wireless device also may be referred to as an access terminal, a terminal, a mobile station, a subscriber unit, a station, etc. A wireless device 120a, 120b, 120c may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

A macro base station 110a may communicate with the communication network 140 over a wired or wireless communication link. The wireless devices 120a, 120b, 120c may communicate with a base station 110a-110d over a wireless communication link.

Wired communication links may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

Wireless communication links may include a plurality of carrier signals, frequencies, or frequency bands, each of which may include a plurality of logical channels. The wireless communication links may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (such as LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may depend on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, various implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to two streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband Internet of things) devices. The wireless device 120 may be included inside a housing that houses components of the wireless device 120, such as processor components, memory components, similar components, or a combination thereof.

In general, any number of communications systems and any number of wireless networks may be deployed in a given geographic area. Each communications system and wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. The scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. In some examples, a wireless device may function as a scheduling entity, scheduling resources for one or more subordinate entities (for example, one or more other mobile devices). In this example, the wireless device is functioning as a scheduling entity, and other mobile devices utilize resources scheduled by the wireless device for wireless communication. A wireless device may function as a scheduling entity in a peer-to-peer (P2P) network, in a mesh network, or another type of network. In a mesh network example, mobile devices may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some implementations, two or more mobile devices 120 (for example, illustrated as the wireless device 120a and the wireless device 120e) may communicate directly using one or more sidelink channels (for example, without using a base station 110 as an intermediary to communicate with one another). For example, the mobile devices 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120 may perform scheduling operations, resource selection operations, as well as other operations described elsewhere herein as being performed by the base station 110.

Base stations and wireless devices also may communicate over shared channels for frequency bands in which the wireless communication network does not schedule access to time-frequency resources. Referred to as unlicensed channels or unlicensed bands, multiple communication devices may transmit at any time that other devices are not using the channel/band. To avoid interfering with other wireless devices using the channel/band, a base station or wireless device follows a Listen-Before-Talk (LBT) procedure to monitor the channel/band for signals transmitted by others for a period of time, and may transmit if no other signals are detected during the LBT monitoring.

In some implementations, a base station 110a-110d or a wireless device 120a-120e may be configured to perform one or more techniques associated with a Channel Occupancy Time (COT) structure indication in an idle state or a connected state. For example, a processor in a wireless device 120 may be configured to receive, from a base station 110a-110d, a set of COT structure indicators (COT-SIs) identifying a set of parameters of a COT for the mobile device, decode at least one COT-SI of the set of COT-SIs to determine at least one parameter of the set of parameters of the COT, and communicate with the base station 110a-110d in accordance with the at least one parameter or based on decoding the at least one COT-SI.

In some implementations, the wireless device 120a-120e may receive COT table configuration information. For example, the wireless device 120a-120e may receive a remaining minimum system information (RMSI) message identifying one or more small sized COT tables for use in obtaining partial COT structure information. In this case, a small sized COT table may be associated with less than a threshold size, such as less than a threshold quantity of entries, less than a threshold quantity of bits, or the like. In this case, the RMSI message may include configuration information for configuring the one or more COT tables, such as information identifying entries for the one or more COT tables, information identifying a concatenation for rows of the one or more COT tables, or the like. Additionally or alternatively, the RMSI also may include a PDCCH monitoring configuration, a downlink channel information (DCI) format for monitoring COT-SI, a size of a COT-SI PDCCH or DCI, a bit location in a DCI of information identifying a row concatenation, information identifying a quantity of bits per row index, information identifying a quantity of concatenated row indices, other bit indicators of other signaled parameters, a COT end symbol indicator, a COT pause start symbol indicator, a COT pause end symbol indicator, information relating to a triggered random access channel (RACH), CG-UL information, traffic class information, LBT information, COT acquisition information, or the like. For example, the wireless device 120a-120e may determine a control resource set (CORESET), a sub-band, a wide-band, a search space set, a set of aggregation levels and corresponding number of candidates, a radio network temporary identifier (RNTI), a time domain, a monitoring periodicity, a monitoring offset, a length of a DCI, or the like for monitoring for a COT-SI, a slot format indicator (SFI) DCI, or the like. In this case, an idle mode wireless device 120 may be able to decode COT-SI bits to indicate one or more ordered entries of a first COT table and a second COT table, as described in more detail herein. In contrast, a connected mode wireless device 120a-120e may be able to decode COT-SI bits for the first COT table, the second COT table, and the third COT table.

Additionally, or alternatively, the wireless device 120a-120e may determine other information regarding a COT structure. For example, when operating in an unlicensed band, the wireless device 120a-120e may determine a COT duration. Additionally, or alternatively, the wireless device 120 may determine a concatenation of one or more rows of a COT table, a CG-UL behavior, or the like, as described in more detail herein.

In some implementations, the wireless device 120a-120e may receive and decode a set of COT-SIs. For example, the wireless device 120a-120e may receive a first COT-SI identifying an index value for a first COT table, a second COT-SI identifying an index value for a second COT table, a third COT-SI identifying an index value for a third COT table, or the like. In this case, the COT-SIs may be bit indicators of a DCI received when monitoring for a PDCCH. In some implementations, the wireless device 120 may determine one or more parameters for communicating with the BS 120 based on the set of COT-SIs. For example, wireless device 120 may determine an LBT type based on whether a transmit occasion is inside or outside of an acquired COT. In another example, the COT-SI may trigger or enable a RACH occasion within the acquired COT for an idle mode wireless device 120a-120e to transmit a RACH. In some implementations, the first COT-SI may include information identifying a COT end symbol, a COT duration (which may be implemented as a remaining COT duration indicator), a first COT pause start symbol, a first COT pause end symbol, a second COT pause start symbol, a second COT pause end symbol, or the like. In this case, the first COT-SI may explicitly identify a remaining COT duration and a COT pause indicator in a DCI. In some cases, information identifying symbol locations, such as a COT end symbol identifier, first COT pause start symbol identifier, a first COT pause end symbol identifier, a second COT pause start symbol identifier, a second COT pause end symbol identifier, or the like, may be indicated as an offset from a current position.

In some implementations, the wireless device 120a-120e may receive and decode a set of COT-SIs based on a state of the wireless device. For example, an idle mode wireless device 120a-120e may decode COT-SIs for the first COT table and the second COT table and a connected mode wireless device 120a-120e may decode COT-SIs for the first COT table, the second COT table, and the third COT table. In some implementations, the wireless device 120a-120e may receive the COT-SIs via a single PDCCH. For example, the wireless device 120a-120e may receive multiple bit indicators in a single PDCCH for multiple COT tables. Additionally, or alternatively, the wireless device 120a-120e may receive the multiple bit indicators via multiple PDCCHs associated with different frequency resources, time resources, monitoring periodicities, monitoring configurations, or the like.

In some implementations, the COT-SIs and the corresponding COT tables may be arranged hierarchically. For example, the wireless device 120a-120e may receive multiple indicators relating to multiple COT tables, such as a set of three COT tables. In this case, the wireless device 120a-120e may receive increasing amounts of information regarding the COT structure as additional resources are available, rather than using a relatively large single resource to signal all information regarding the COT structure.

In some implementations, the wireless device 120a-120e may receive multiple COT tables in different incremental stages. For example, a wireless device may receive the first COT table and the second COT table through an RMSI and may receive the third COT table after connecting and via a wireless device specific RRC message. In another example, the first COT table may be stored, and the wireless device 120a-120e may receive a first part of the third COT table in the RMSI and a second part of the third COT table in a wireless device specific RRC after connecting. In this case, the first part of the third COT table may be the second COT table.

In some implementations, the wireless device 120a-120e may determine a particular set of information regarding the COT structure based on the first COT table. For example, with regard to the first COT table, the wireless device 120a-120e may determine whether each symbol in a slot is inside a COT or outside a COT without indicating whether a symbol is for UL or DL. In this case, a quantity of rows and entries of the first COT table may be relatively short, such as a set of 8 rows and a set of 14 columns, since the first COT table is configured through the RMSI which may be limited in size; however, the wireless device 120a-120e may receive an indicator via a DCI to concatenate a set of row indices. In this way, the wireless device 120 is enabled to receive a single COT-SI index for the first COT table that identifies a COT structure for multiple upcoming slots. As another example, the first COT table may indicate, via a single row, whether multiple slots or symbols are inside a COT or outside a COT.

In some implementations, the wireless device 120 may combine the COT-SI information regarding the first COT table with other COT information received with the COT-SI or separate from the COT-SI to determine a COT structure. For example, the wireless device 120a-120e may receive a COT duration indicator (which may be indicated using a remaining COT duration indicator), a COT pause indicator, or the like in a DCI to combine with information regarding whether a particular symbol or slot is inside a COT or outside a COT. In some implementations, the COT pause indicator may indicate a start of a COT pause, a length of a COT pause, an end of a COT pause, or the like. In some implementations, the COT pause indicator may use a particular identifier. For example, the wireless device 120a-120e may interpret an outside COT indication ("O" or "Out") disposed between multiple inside COT indications ("I's" or "In's") as a COT pause indicator. Additionally, or alternatively, the wireless device 120 may receive an explicit COT pause indicator (which could be represented as "P" or "Pause"), a COT start symbol and end symbol identifier from which the wireless device 120 can derive the COT pause, or the like.

In some implementations, the wireless device 120a-120e may receive a first COT-SI that explicitly includes a COT end symbol or a COT duration indicator (which may be a remaining COT duration indicator), a COT pause start symbol, and a COT end symbol. In this case, the wireless device 120a-120e may not receive the first COT table.

Additionally, or alternatively, with regard to a second COT table, the wireless device 120a-120e may determine whether a slot is assigned for downlink ("D"), assigned for uplink ("U"), flexibly assigned ("F"), included in a COT pause ("O" or "P"), or the like. In this case, the second COT table provides partial slot information, such as providing one of a slot level indication, a mini-slot level indication, a symbol-group level indication, or the like, rather than multiple levels of indication, thereby reducing resource utilization. In some implementations, the second COT table may identify a slot assignment for multiple slots with each index, but less than an entirety of a COT. In this case, the wireless device 120a-120e may receive a COT-SI DCI to concatenate multiple row indices to enable signaling of a greater portion of a COT or the entirety of the COT.

In some implementations, the second COT table may be a truncation of the third COT table. For example, the second COT table may include a subset of rows of the third COT table, such as the first one or more rows. In this way, a size limit for tables configured through RMSI may be observed. In some implementations, the wireless device 120a-120e may receive a COT-SI DCI for the second COT table that identifies a row that is not included in the second COT table, such as an index greater than a greatest index of the second COT table. In this case, the wireless device 120a-120e may determine that a set of slots are associated with a default configured assignment, such as an unknown assignment, and the wireless device may communicate in accordance with the default configured assignment. As another example, each row in the second COT table may include information identifying a length of a COT duration, a quantity of DL slots, a quantity of DL symbols, a quantity of flexible symbols, a quantity of UL symbols, a quantity of UL slots, or the like.

Additionally, or alternatively, with regard to a third COT table, the wireless device 120a-120e may determine an entirety of a COT structure at a symbol level. For example, the third COT table may include information identifying whether each symbol is assigned as a DL symbol, an UL symbol, a flexible symbol, or the like. In some implementations, the third COT table may be a slot format combination table that identifies a slot format for symbols of an indicated quantity of consecutive slots. In some implementations, information derived from the third COT table may override information derived from the second COT table. For example, when a symbol is identified as flexibly assigned based on the second COT table, the wireless device 120a-120e may determine that the flexible assignment is to be an UL assignment based on the third COT table.

In some implementations, the wireless device 120a-120e may receive other information in connection with the COT-SIs. For example, the wireless device 120 may receive information identifying a size of a DCI, information identifying a position of bits identifying COT table indices within a DCI, a quantity of concatenated rows of a COT table, or the like. Additionally or alternatively, the wireless device 120 may receive information identifying a current location with respect to a start of a COT, a traffic priority class of the COT, whether the base station 110a-110d or another wireless device 120a-120e acquired the COT, a dynamically triggered physical RACH (PRACH) resource information, a dynamically triggered PRACH enable or trigger message, LBT type for the COT, a CG-UL parameter, a two-stage grant resource and triggering information, or the like.

In some implementations, the wireless device 120a-120e may determine a particular CG-UL behavior based on the CG-UL parameter. For example, the wireless device 120 may determine that CG-UL is allowed if a category type 4 LBT procedure is configured and a COT start is not yet detected. Additionally, or alternatively, when a COT start is detected but a COT-SI is not yet received, is not yet processed, or the like, the wireless device 120a-120e may cancel a CG-UL. Additionally, or alternatively, the wireless device 120a-120e may avoid canceling the CG-UL if a scheduled grant is not detected. Additionally, or alternatively, when at a time inside a COT and a COT-SI is detected and processed by the wireless device 120a-120e, the wireless device may cancel the CG-UL when a slot is assigned for DL. Additionally, or alternatively, the wireless device 120a-120e may refrain from canceling the CG-UL when the slot is assigned for UL, and may observe a signaled behavior associated with the CG-UL parameter when the slot is assigned as flexible slot.

In some implementations, rather than receiving a COT-SI, the wireless device 120a-120e may receive an explicit SFI for each slot of a COT. For example, the wireless device 120a-120e may receive a DCI conveying the explicit SFI that indicates a slot format for an entirety of the COT based on a stored table associated with an unlicensed spectrum frame structure. Based on the stored table being smaller than a slot format combination table, such as based on the unlicensed spectrum being associated with a maximum COT size of less than a threshold, a quantity of bits in the DCI to signal the COT structure is reduced. In this case, the wireless device 120a-120e may determine that the DCI conveys an explicit SFI based on a bit indicator in the DCI indicating that the DCI conveys the explicit SFI rather than one or more COT-SIs. In some implementations, the DCI may signal a COT table that includes a symbol representing slots that are not within a COT. In some implementations, the DCI may include an explicit COT duration indicator to enable the wireless device 120a-120e to determine the length of the COT.

In some implementations, the wireless device 120 may decode one or more COT-SIs and may communicate in accordance with a COT structure identified by the one or more COT-SIs. Each COT-SI may include information about the TXOP, such as the remaining COT duration, start and length of pauses inside the TXOP, DL or UL slot indications of the slots in TXOP, sub-band usage indication of the TXOP, etc.

Various implementations may be implemented on a number of single processor and multiprocessor computer systems, including a system-on-chip (SOC) or system in a package (SIP).

Figure 2:
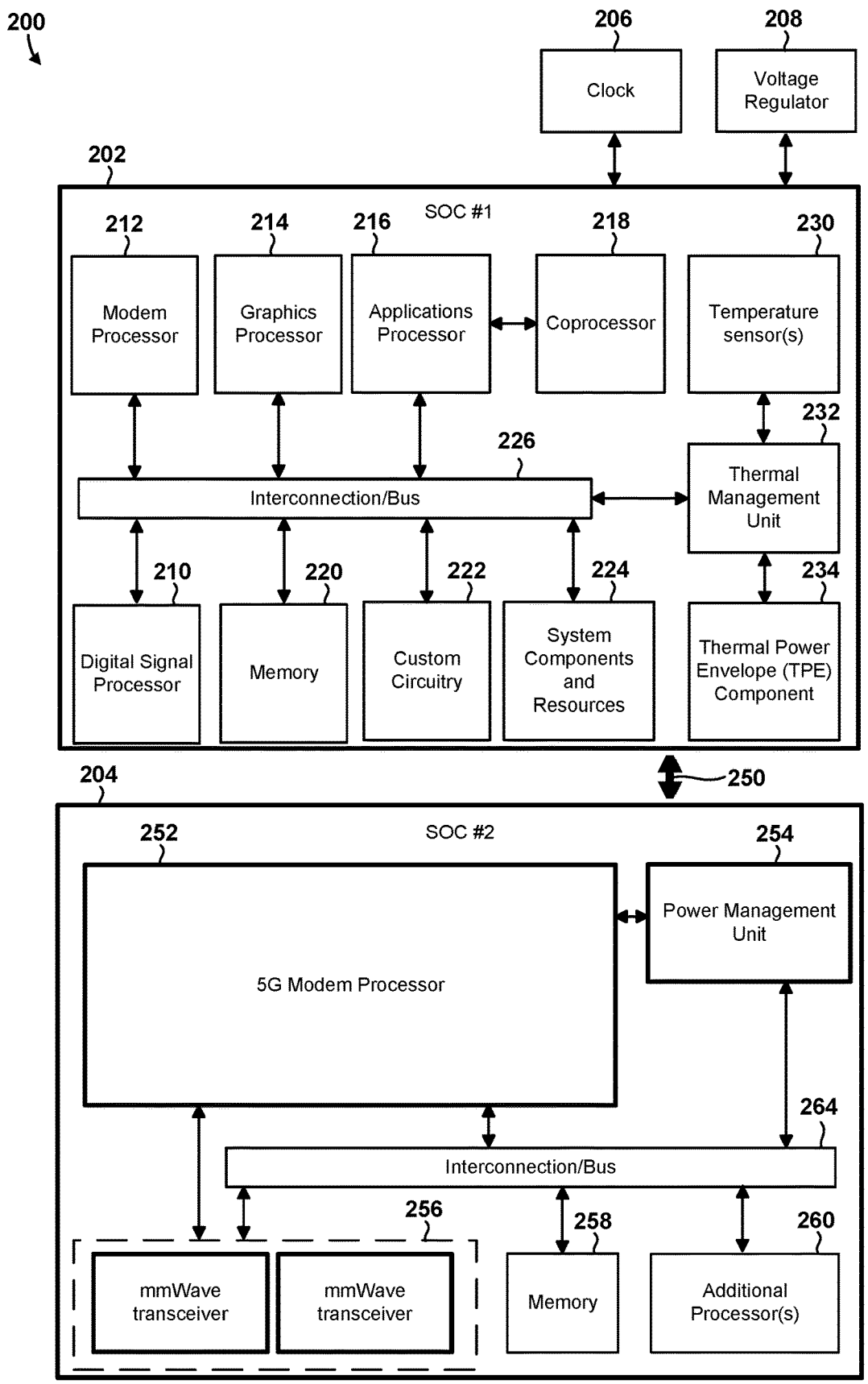
FIG. 2 shows a component block diagram of an example computing system.

FIG. 2 illustrates an example computing system or SIP 200 architecture that may be used in wireless devices implementing the various implementations.

With reference to FIGS. 1 and 2, the illustrated example SIP 200 includes a two SOCs 202, 204, a clock 206, and a voltage regulator 208. In some implementations, the first SOC 202 may operate as a CPU of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wavelength (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, various implementations may be implemented in a wide variety of computing systems, which may include a single processor, multiple processors, multicore processors, or any combination thereof.

Figure 3:
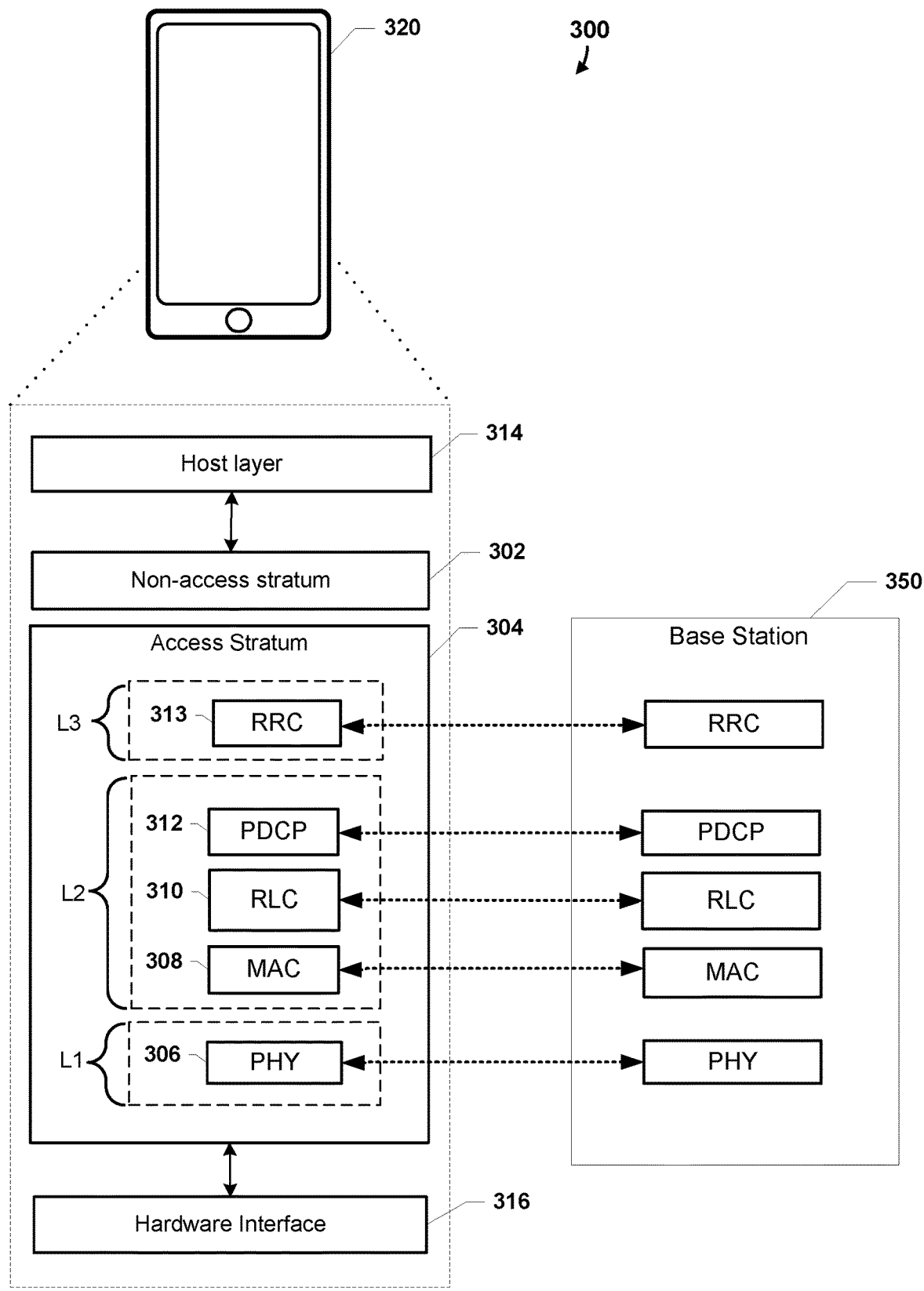
FIG. 3 shows a component block diagram of an example software architecture including a radio protocol stack for the user and control planes in wireless communications.

FIG. 3 illustrates an example of a software architecture 300 including a radio protocol stack for the user and control planes in wireless communications between a base station 350 (such as base station 110a-110d) and a wireless device 320 (such as any of the wireless devices 120a-120e). With reference to FIGS. 1-3, the wireless device 320 may implement the software architecture 300 to communicate with the base station 350 of a communication system (such as 100). In various implementations, layers in software architecture 300 may form logical connections with corresponding layers in software of the base station 350. The software architecture 300 may be distributed among one or more processors (such as the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (such as two protocol stacks associated with two SIMs, respectively, in a dual-SIM wireless communication device). While described below with reference to LTE communication layers, the software architecture 300 may support any of variety of standards and protocols for wireless communications, or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the PDCCH and the Physical Downlink Shared Channel (PDSCH).

In the user and control planes, Layer 2 (L2) of the AS 304 may be responsible for the link between the wireless device 320 and the base station 350 over the physical layer 306. In some implementations, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the wireless device 320 and the base station 350.

In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In some other implementations, the software architecture 300 may include one or more higher logical layer (such as transport, session, presentation, application, etc.) that provide host layer functions. For example, in some implementations, the software architecture 300 may include a network layer (such as IP layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more RF transceivers).

Figure 4:
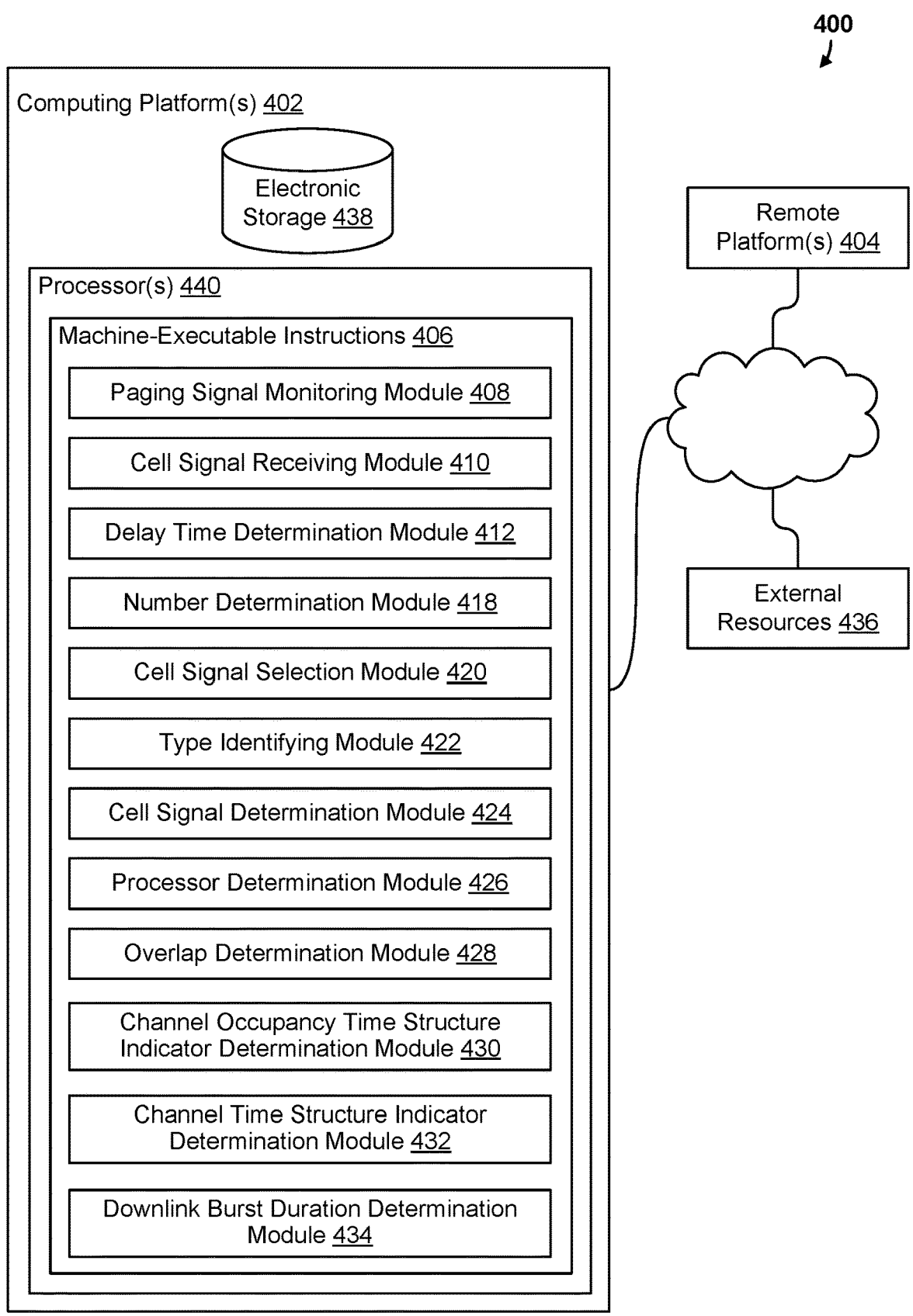
FIG. 4 shows a component block diagram of an example system configured for managing paging monitoring by a processor of a wireless device.

FIG. 4 shows a component block diagram illustrating a system 400 configured for managing paging monitoring by a processor of a wireless device in accordance with some implementations. In some implementations, the system 400 may include one or more computing platforms 402 or one or more remote platforms 404. With reference to FIGS. 1-4, the computing platform(s) 402 may include a base station (such as the base station 110a-110d) or a wireless device (such as the wireless device 120a-120e, 200, 320). The remote platform(s) 404 may include a base station (such as the base station 110a-110d) or a wireless device (such as the wireless device 120a-120e, 200, 320).

The computing platform(s) 402 may be configured by machine-executable instructions 406. Machine-executable instructions 406 may include one or more instruction modules. The instruction modules may include computer program modules. The instruction modules may include one or more of a paging signal monitoring module 408, a cell signal receiving module 410, a delay time determination module 412, a number determination module 418, a cell signal selection module 420, a type identifying module 422, a cell signal determination module 424, a processor determination module 426, an overlap determination module 428, a channel occupancy time structure indicator determination module 430, a channel time system information determination module 432, a downlink burst duration determination module 434, or other instruction modules.

The paging signal monitoring module 408 may be configured to monitor for a paging signal from a cell of a communication network (such as base station 110), including monitoring for a determined delay time.

The cell signal receiving module 410 may be configured to receive a serving cell signal from the cell.

The delay time determination module 412 may be configured to determine a delay time based on the serving cell signal. In some implementations, the delay time may be determined based on the determined number of paging signal monitoring occasions. In some implementations, the delay time may be determined based on the selected number (such as a predetermined number) of paging signal monitoring occasions. In some implementations, the delay time may be determined based on the type of serving cell signal. In some implementations, the delay time may be determined based on the determination that the serving cell signal includes paging control information. In some implementations, the delay time determination module 412 may be configured to determine that the delay time is substantially zero in response to determining that the processor has identified the strongest beam of the cell. In some implementations, the delay time may include the earlier of a successful decoding of a physical downlink shared channel scheduled by the paging control information and an end of a paging occasion during which the paging control information was received. In some implementations, the delay time may include the earlier of a successful decoding of a physical downlink shared channel scheduled by the paging control information and an end of a predetermined number of paging signal monitoring occasions. In some implementations, the delay time may be determined based on the determination that the serving cell signal includes channel occupancy time structure indicator which indicates overlap of channel occupancy duration with a paging occasion. In some implementations, the delay time may include an end of the paging occasion in response to determining that the overlap is less than the threshold. In some implementations, the delay time may include the remaining channel occupancy time duration in response to determining that the overlap is not less than the threshold.

In some implementations, the delay time may be determined based on a duration of the paging occasion. In some implementations, the delay time may be determined based on a first paging signal monitoring occasion that overlaps with a downlink burst indicated in the channel occupancy time structure indicator. In some implementations, the delay time determination module 412 may be configured to determine that the delay time is substantially zero in response to determining that the paging occasion overlaps with the uplink burst. In some implementations, the delay time determination module 412 may be configured to determine the delay time based on a duration of the paging occasion. In some implementations, the delay time determination module 412 may be configured to determine the delay time based on a first paging signal monitoring occasion that overlaps with a downlink burst indicated in the channel occupancy time structure indicator. In some implementations, the delay time determination module 412 may be configured to determine that the delay time is substantially zero in response to determining that the paging occasion overlaps with the pause duration.

In some implementations, the delay time may include the remainder of a paging occasion in response to determining that the overlap of downlink burst duration with a synchronization signal block-based measurement timing duration is less than the threshold. In some implementations, the delay time may be determined based on a number of paging signal monitoring occasions that to not overlap with the synchronization signal block-based measurement timing configuration message. In some implementations, the delay time may be determined based on a number of paging signal monitoring occasions that occur after a synchronization sequences burst.

In some implementations, the number determination module 418 may be configured to determine a number of paging signal monitoring occasions based on the serving cell signal.

In some implementations, the cell signal selection module 420 may be configured to select based on the serving cell signal, a predetermined number of paging signal monitoring occasions.

In some implementations, the type identifying module 422 may be configured to identify a type of serving cell signal received from the cell.

In some implementations, the cell signal determination module 424 may be configured to determine that the serving cell signal includes paging control information. In some implementations, the cell signal determination module 424 may be configured to determine that the serving cell signal includes channel occupancy time structure indicator.

In some implementations, the processor determination module 426 may be configured to determine whether the processor has identified a strongest beam of the cell based on a synchronization signal block.

In some implementations, the overlap determination module 428 may be configured to determine whether an overlap of a remaining channel occupancy time duration with a paging occasion is less than a threshold.

In some implementations, the channel occupancy time structure indicator determination module 430 may be configured to determine based on the channel occupancy time structure indicator that a paging occasion overlaps with an uplink burst. In some implementations, the channel occupancy time structure indicator determination module 430 may be configured to determine based on the channel occupancy time structure indicator that a paging occasion overlaps with a pause duration. In some implementations, the channel time system information determination module 432 may be configured to determine that the channel occupancy time structure indicator does not indicate a downlink burst. In some implementations, the channel time system information determination module 432 may be configured to determine whether the channel occupancy time structure indicator is received during a synchronization signal block-based measurement timing duration.

In some implementations, the downlink burst duration determination module 434 may be configured to determine whether overlap of a downlink burst duration indicated in the channel occupancy time structure indicator with a synchronization signal block-based measurement timing duration is less than a threshold.

Figure 5A:
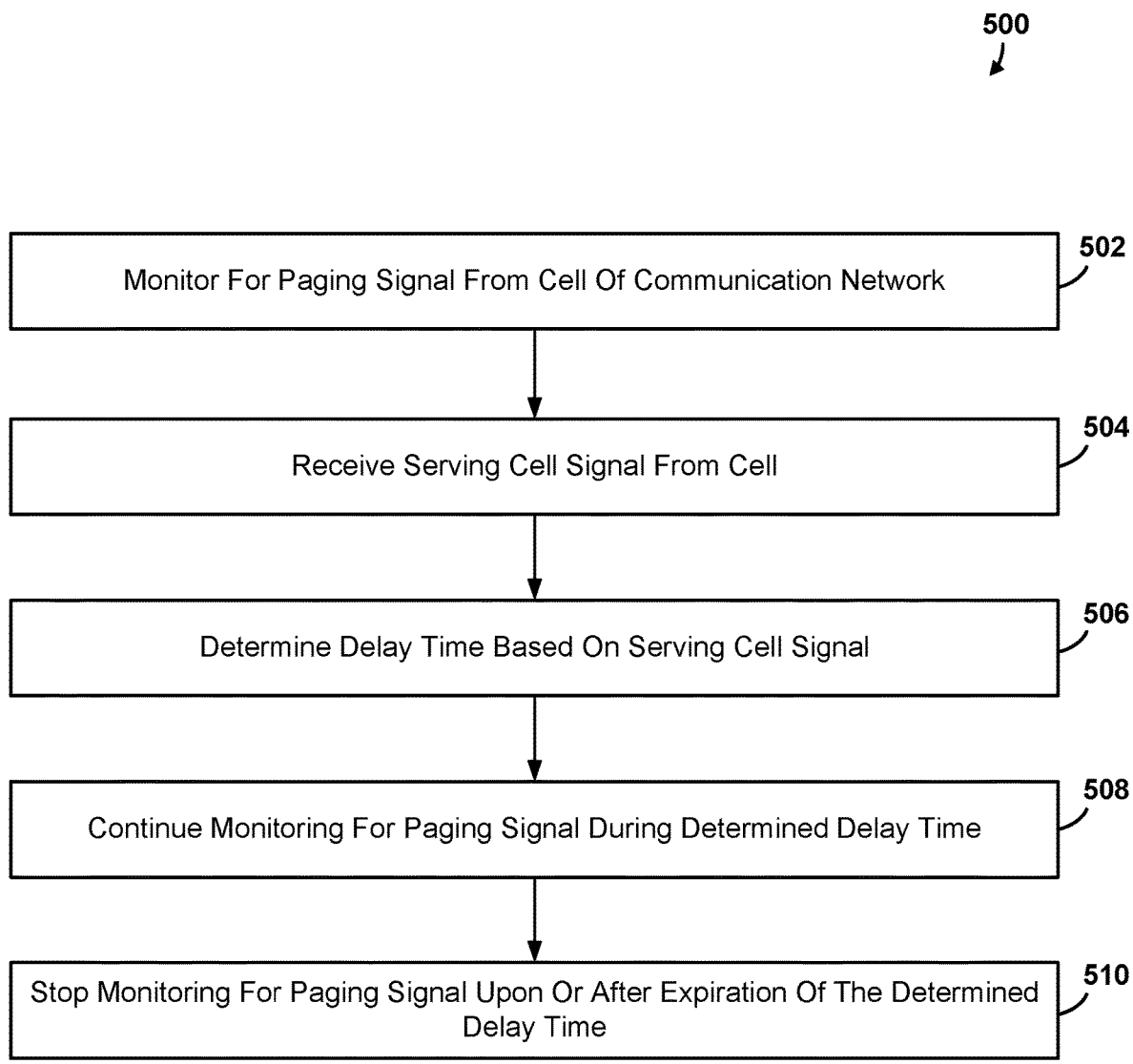
FIG. 5A shows a process flow diagram of an example method for managing paging monitoring by a processor of a wireless device.
Figure 5B:
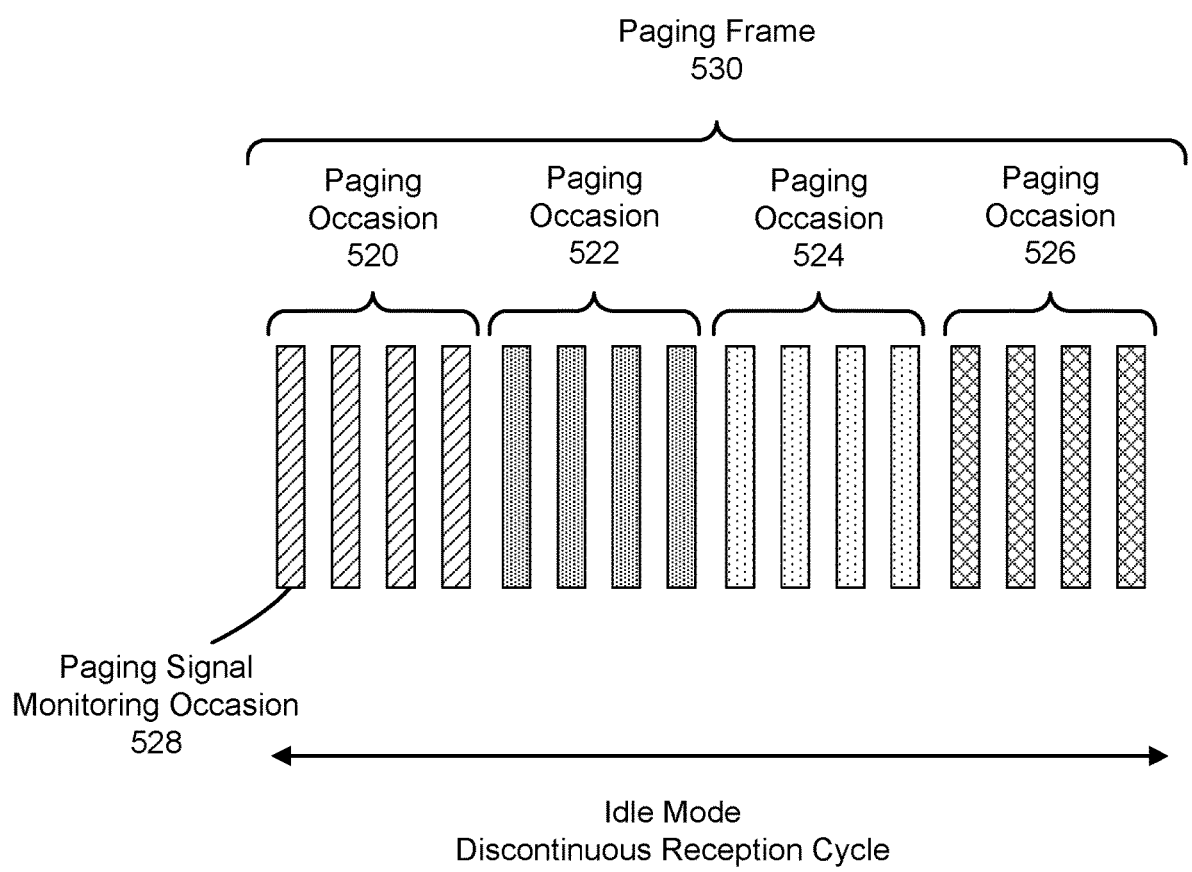
FIGS. 5B and 5C show diagrams of example methods for managing paging monitoring by a processor of a wireless device.
Figure 5C:
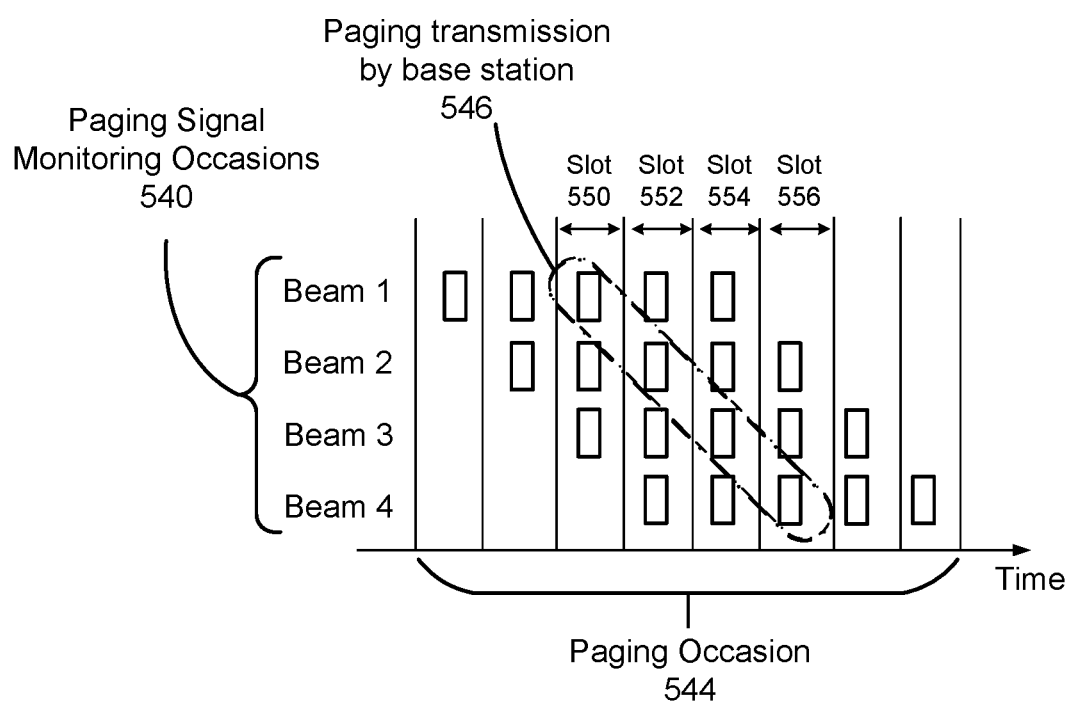

FIGS. 5A-5C show process flow diagrams of an example method 500 of managing paging monitoring by a processor of a wireless device according to some implementations. With reference to FIGS. 1-5C, the method 500 may be implemented by an apparatus of the wireless device, such as a processor (such as 212, 216, 252 or 260) of a wireless device (such as the wireless device 120a-120e, 200, 320).

In block 502, the processor may monitor for a paging signal from a cell of a communication network. In some implementations, the processor may monitor for a paging signal during one or more paging occasions. FIG. 5B illustrates a paging frame 530 that may include multiple paging occasions 520-526, and each of the paging occasions 520-526 may include one or more paging signal monitoring occasions 528. A base station (such as the base station 110a-110d) may transmit a paging signal one or more times during a paging occasion, corresponding to a paging signal monitoring occasion. In some implementations, a paging occasion may include one or more PDCCH monitoring occasions. In some implementations, each paging signal monitoring occasion may be associated with a Synchronization Signal Block (SSB) beam. In some implementations, each paging signal monitoring occasion may be associated with a different SSB beam. In some implementations, each paging signal monitoring occasion may be consecutive, and may start within the paging frame. The paging frame may be determined based on an identity of a wireless device, and may repeat every discontinuous reception cycle. In some implementations, the base station may indicate to the wireless device which paging signal monitoring occasion may be used as a first paging signal monitoring occasion.

FIG. 5C illustrates a paging occasion 544 that may include multiple slots 550-556. Each slot 550-556 may include one or more paging signal monitoring occasions 540. In some implementations, a base station (such as a gNB) may associate multiple beams (such as beams 1, 2, 3, or 4) with a single paging signal monitoring occasion 540. For each beam, the base station may indicate multiple paging signal monitoring occasions to the wireless device. For example, in some implementations, the base station may indicate to the wireless device in a message (such as a System Information Block (SIB)-1 message or another suitable message) that a paging signal monitoring occasion includes (S*X) consecutive PDCCH monitoring occasions, where S represents a number of SSBs to be transmitted and X represents a number of physical downlink control channel (PDCCH) monitoring occasions per synchronization signal block (SSB) in a paging occasion. In some implementations, the number S of SSBs to be transmitted may be determined according to information in the SIB1 message, such as a ssb-PositionsInBurst information element. In some implementations, the number X of PDCCH monitoring occasions per SSB in a paging occasion may be indicated in the SIB1 message, such as in a nrofPDCCH-MonitoringOccasion-PerSSB-InPO information element. Different beams may have overlapping paging signal monitoring occasions. In some implementations, the wireless device may only need to monitor paging signal monitoring occasions associated with the beam which is the best beam for the wireless device. Area 546 shows a paging transmission 546 sent by the base station. For example, the base station may send a paging message for Beam 1 in a 3rd occasion (slot 550), a paging message for Beam 2 in a 4th occasion (slot 552), a paging message for Beam 3 in a 5th occasion (slot 554), and a paging message for Beam 4 in a 6th occasion (slot 556). If the best beam for the wireless device is Beam 2, then the wireless device may monitor paging occasion 2 to paging occasion 6. The wireless device will receive the paging message on 4th occasion (on Beam 2, based on the above points).

In block 504 the processor may receive a serving cell signal from the cell. In some implementations, a serving cell signal may include paging control information, such as a PDCCH message identified by a Paging-Radio Network Temporary Identifier (P-RNTI). In some implementations, a serving cell signal may include a COT-SI message as described above. In some implementations, the P-RNTI may differentiate or identify one or more wireless devices for the transmission of a paging signal. As described above, in some implementations, the COT-SI may identify parameters of a COT for a wireless device to enable the wireless device to communicate with a base station.

In order to detect a COT-SI message, the processor may monitor a search space corresponding to a PDCCH (such as a Group Common (GC)-PDCCH) in addition to a paging message search space. However, configuring such separate search spaces may increase wireless device power consumption. To address this issue, in some implementations, the base station may configure a common search space for paging-related signaling and serving cell signals. For example, the base station may configure a common search space to transmit COT-SI messages and paging messages. While blind decoding by the wireless device may increase to successfully receive the COT-SI message(s), overall power consumption will remain smaller than power consumed by monitoring separate search spaces.

In some implementations, the processor may attempt to receive the serving cell signal in the paging search space. In such implementations, the base station may transmit the serving cell signals within the paging search space. Alternatively, the base station may transmit the serving cell signals using PDCCH occasions that overlap with the paging search space.

In some implementations, the base station may send a P-RNTI message (such as P-RNTI downlink channel information (DCI)) without an associated Physical Downlink Shared Channel (PDSCH) message. In such implementations, the P-RNTI DCI may indicate that no PDSCH message is scheduled. In such implementations, the processor may only monitor for the P-RNTI DCI or other suitable message, rendering additional decoding by the processor unnecessary. In some implementations, the base station may provide an indication in the system information or other suitable message that monitoring for the P-RNTI DCI or other suitable message is required. In some implementations, such signaling from the base station to the wireless device may function as a "go to sleep" message for paging monitoring operations by the wireless device.

In some implementations, the processor may limit monitoring for the serving cell signal to within paging signal monitoring occasions. In some implementations, the processor may monitor for a predetermined number of serving cell signal occasions prior to a paging signal monitoring occasion. In such implementations, the processor may determine the predetermined number of serving cell occasions based on a number of SSB beams. In some implementations, the processor may determine that the predetermined number of serving cell occasions is equal to the number of SSB beams.

In block 506 the processor may determine a delay time based on the serving cell signal. In some implementations, after receiving a serving cell signal, the processor may continue to monitor for a paging signal for the determined delay time. In some implementations, the processor may stop monitoring for the paging signal at the end or expiration of the determined delay time. In some implementations, the processor may identify a type of serving cell signal received from the cell. For example, the processor may determine that the serving cell signal is a P-RNTI PDCCH message. As another example, the processor may determine that the serving cell signal is a COT-SI message. Example of operations that the processor may perform to determine the delay time are further described below.

In block 508 the processor may continue monitoring for the paging signal during the determined delay time.

In block 510 the processor may stop the monitoring for the paging signal upon or after expiration of the determined delay time.

Figure 6A:
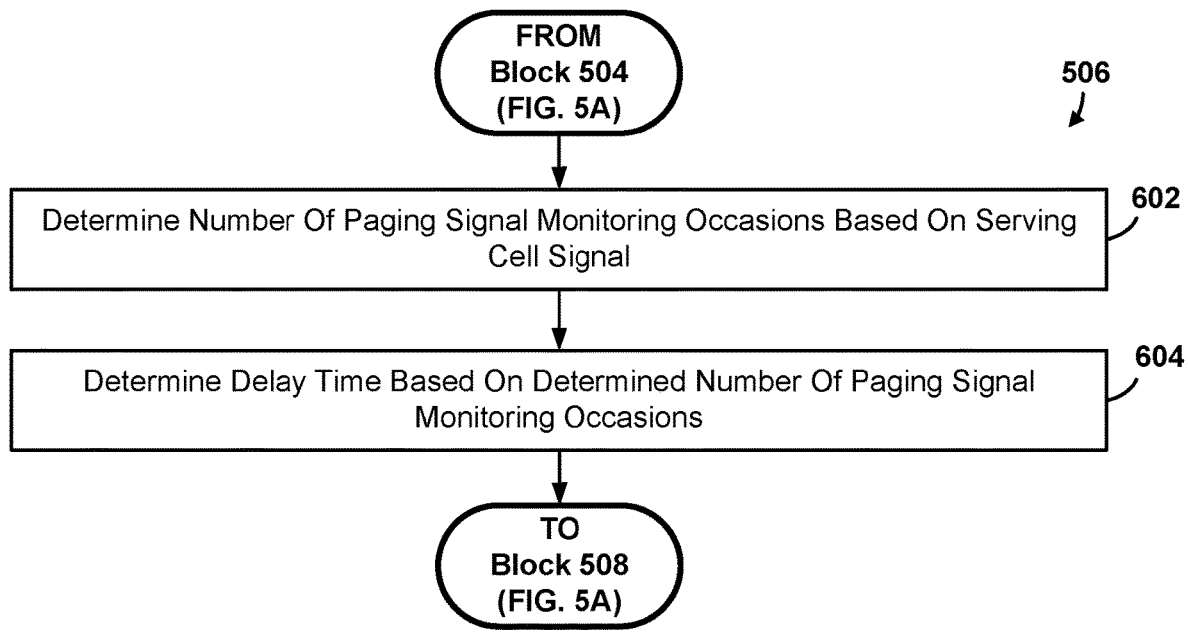
FIGS. 6A and 6B show process flow diagrams of example operations that may be performed as part of the methods for managing paging monitoring by a processor of a wireless device.
Figure 6B:
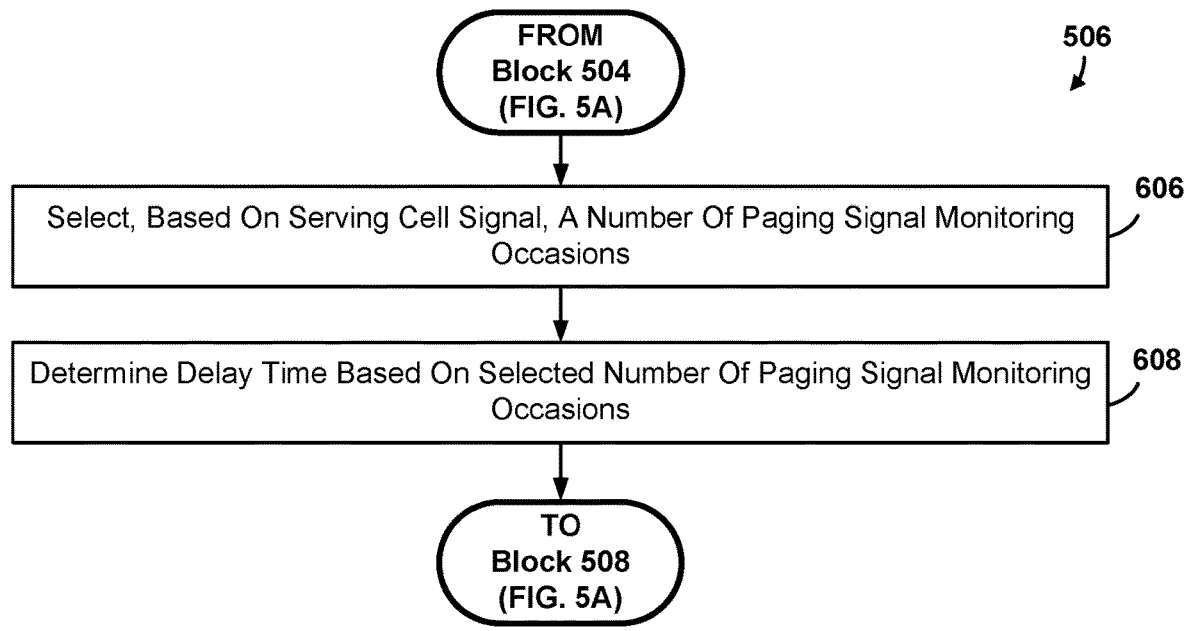

FIGS. 6A and 6B show process flow diagrams of example operations that may be performed as part of the method 500 to determine a delay time based on the serving cell signal according to some implementations. With reference to FIGS. 1-6B, the example operations may be implemented by an apparatus of the wireless device, such as a processor of a wireless device (such as the wireless device 120, 200, 320).

Referring to FIG. 6A, in some implementations following the operations of block 504 (FIG. 5A), the processor may determine a number of paging signal monitoring occasions based on the serving cell signal in block 602. In some implementations, the processor may identify a type of serving cell signal received from the cell. For example, the processor may determine that the serving cell signal is a P-RNTI PDCCH message. As another example, the processor may determine that the serving cell signal is a COT-SI message.

In block 604, the processor may determine the delay time based on the determined number of paging signal monitoring occasions. For example, after receiving a P-RNTI PDCCH message, the processor may determine the delay time to be X number of PDCCH monitoring occasions. As another example, after receiving a COT-SI message, the processor may determine the delay time to be Y number of PDCCH monitoring occasions. In some implementations, the processor may determine the delay time based on the type of serving cell signal. In some implementations, the value of X may be substantially zero (i.e., stop paging monitoring immediately). In some implementations, the values of X and Y may be in terms of absolute time units. In some implementations, the processor may determine the value of Y based on an indication in the COT-SI that the base station has higher priority data that it will transmit in the beginning of COT over paging.

The processor may then perform the operations of block 508 (FIG. 5A).

Referring to FIG. 6B, in some implementations following the operations of block 504 (FIG. 5A), the processor may select, based on the serving cell signal, a predetermined number of paging signal monitoring occasions in block 606.

In block 608, the processor may determine the delay time based on the selected number (which may be a predetermined number) of paging signal monitoring occasions.

The processor may then perform the operations of block 508 (FIG. 5A).

Figure 7A:
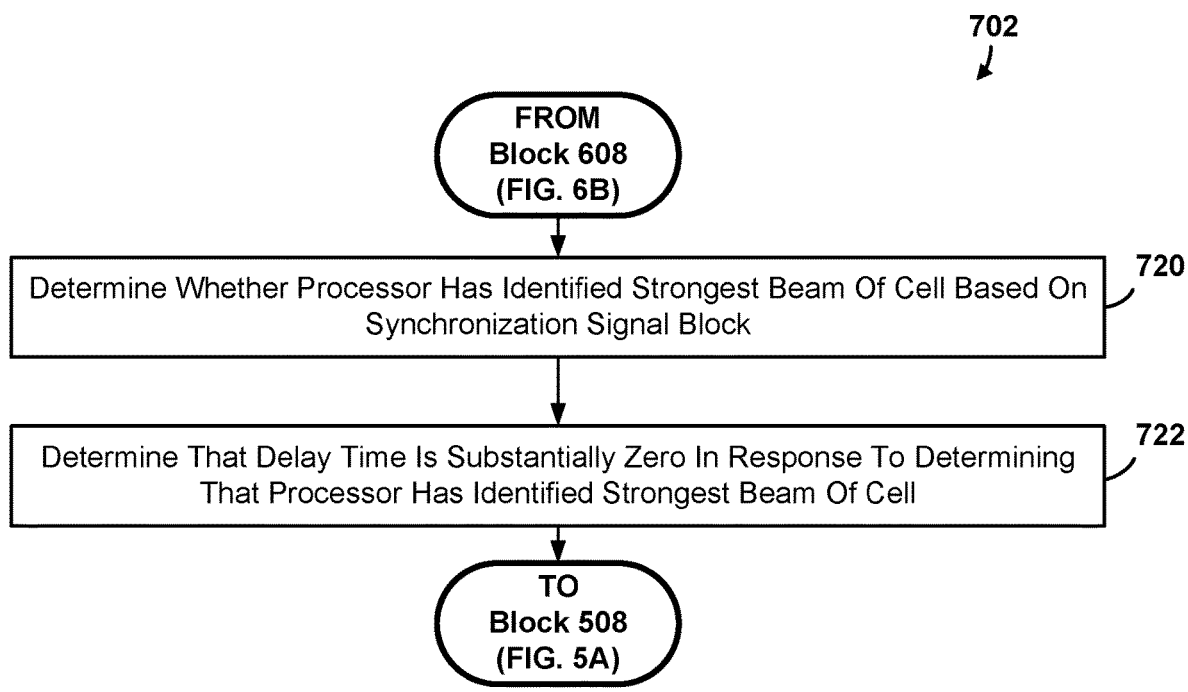
FIGS. 7A-7C show process flow diagrams of example operations that may be performed as part of the methods for managing paging monitoring by a processor of a wireless device.
Figure 7B:
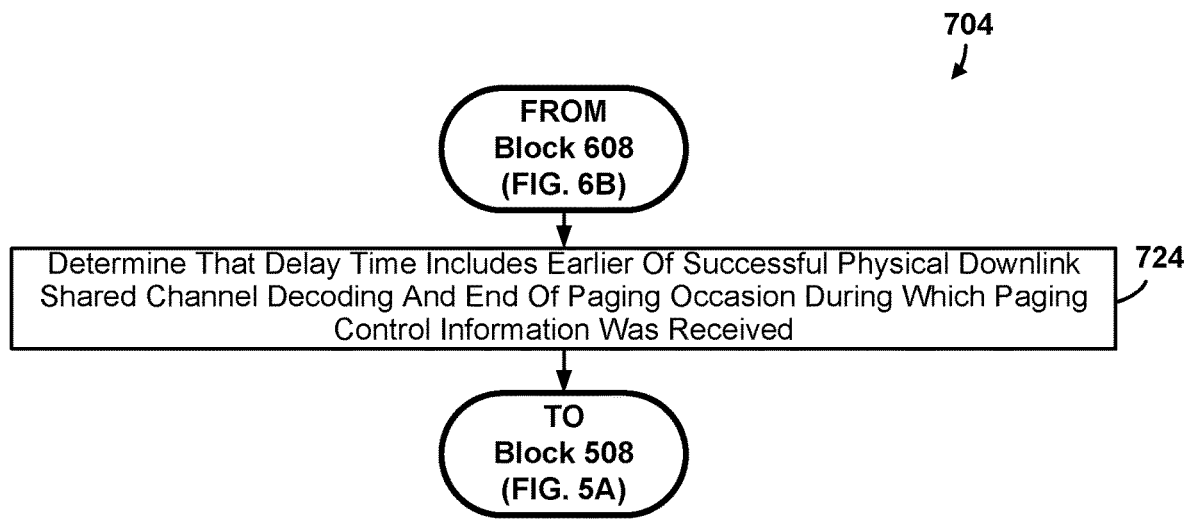
Figure 7C:
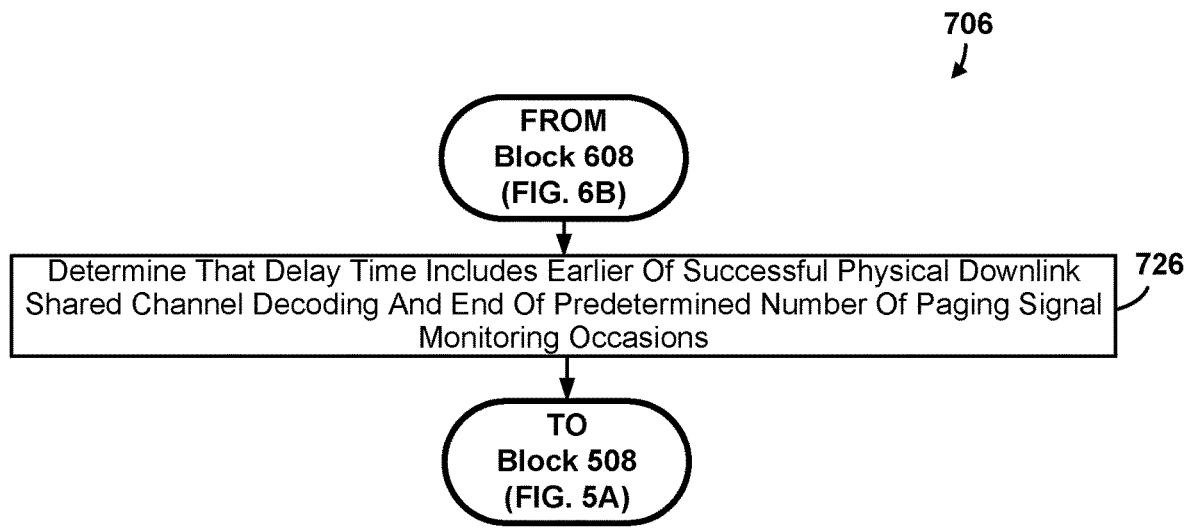

FIGS. 7A-7C show process flow diagrams of example operations 702, 704, 706 that may be performed as part of the method 500 to determine a delay time based on the serving cell signal according to some implementations. With reference to FIGS. 1-7C, the example operations may be implemented by an apparatus of the wireless device, such as a processor of a wireless device (such as the wireless device 120, 200, 320).

In some implementations, the processor may determine that a P-RNTI has been received, and that the processor may stop monitoring paging occasions substantially immediately (i.e., X=0). In some implementations, the processor also may determine whether the processor has successfully received or decoded a PDSCH message scheduled using P-RNTI PDCCH message.

Referring to FIG. 7A and operations 702, in some implementations following the operations of block 608 (FIG. 6B), the processor may determine whether the processor has identified a strongest beam of the cell based on a synchronization signal block (SSB) in block 720.

In block 722, the processor may determine that the delay time is substantially zero in response to determining that the processor has identified the strongest beam of the cell.

The processor may then perform the operations of block 508 (FIG. 5A).

Referring to FIG. 7B and operations 704, in some implementations following the operations of block 608 (FIG. 6B), in block 724, the processor may determine that the delay time includes the earlier of a successful physical downlink shared channel decoding scheduled using P-RNTI PDCCH and an end of a paging occasion during which the paging control information was received.

The processor may then perform the operations of block 508 (FIG. 5A).

Referring to FIG. 7C and operations 706, in some implementations following the operations of block 608 (FIG. 6B), in block 726, the processor may determine that the delay time includes the earlier of a successful physical downlink shared channel decoding scheduled using P-RNTI PDCCH and an end of a predetermined number of paging signal monitoring occasions. In some implementations, the predetermined number of paging signal monitoring occasions may be based on a number of beams provided by the base station. In some implementations, the predetermined number of paging signal monitoring occasions may be one less than the number of beams provided by the base station (such as N=# of beams at gNB−1).

The processor may then perform the operations of block 508 (FIG. 5A).

FIGS. 8A-8M show process flow diagrams of example operations that may be performed as part of the method 500 to determine a delay time based on the serving cell signal according to some implementations. With reference to FIGS. 1-8J, the example operations may be implemented by an apparatus of the wireless device, such as a processor of a wireless device (such as the wireless device 120, 200, 320).

Figure 8A:
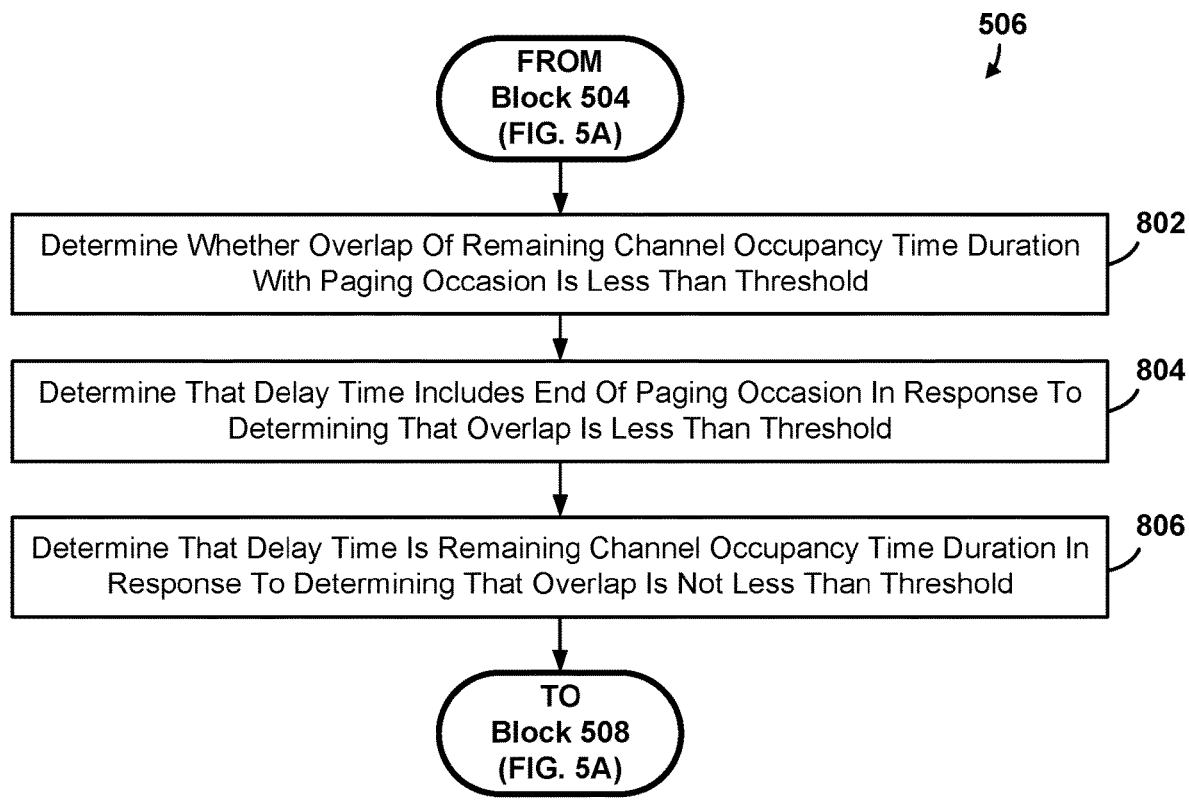
FIGS. 8A-8M show process flow diagrams of example operations that may be performed as part of the methods for managing paging monitoring by a processor of a wireless device.

Referring to FIG. 8A, in some implementations following the operations of block 504 (FIG. 5A), the processor may determine whether an overlap of a remaining channel occupancy time duration with a paging occasion is less than a threshold in block 802. In some implementations, the threshold may be a number of time units (such as a number of milliseconds). In some implementations, the threshold may be a number of paging signal monitoring occasions (such as PDCCH monitoring occasions). Other threshold types also may be possible.

In block 804, the processor may determine that the delay time includes an end of the paging occasion in response to determining that the overlap is less than the threshold.

In block 806 the processor may determine that the delay time is the remaining channel occupancy time duration in response to determining that the overlap is not less than the threshold. In some implementations, the processor may determine that the delay time is less than or equal to the remaining channel occupancy time duration (or at most, the remaining channel occupancy time duration) in response to determining that the overlap is not less than the threshold.

The processor may then perform the operations of block 508 (FIG. 5A).

Figure 8B:
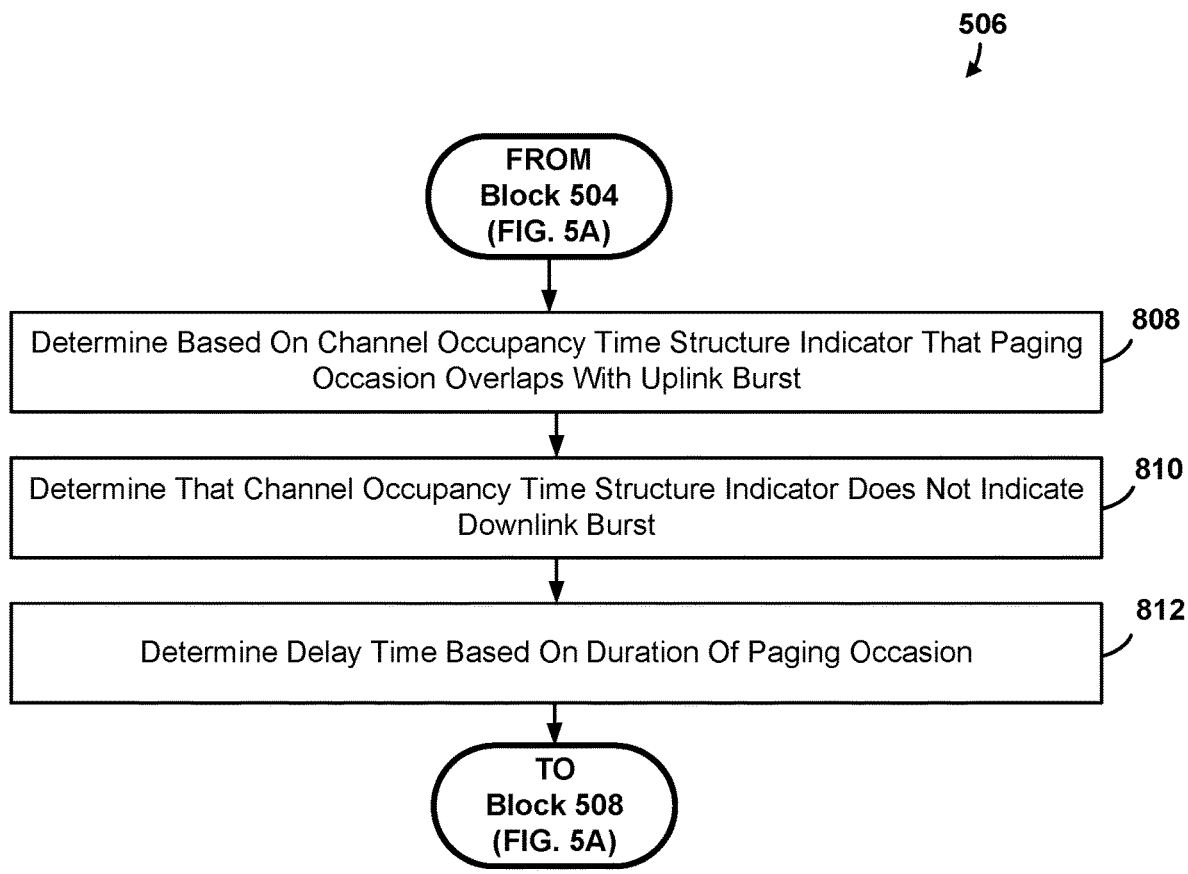

Referring to FIG. 8B, in some implementations following the operations of block 504 (FIG. 5A), the processor may determine based on the channel occupancy time structure indicator that a paging occasion overlaps with an uplink burst in block 808.

In block 810, the processor may determine that the channel occupancy time structure indicator does not indicate a downlink burst.

In block 812, the processor may determine the delay time based on a duration of the paging occasion. In some implementations, the processor may determine not to monitor paging signal monitoring occasions that overlap with the uplink burst. In some implementations, the processor may determine the delay time based on the duration of the paging occasion even if the channel occupancy structure indicator indicates a downlink burst.

The processor may then perform the operations of block 508 (FIG. 5A).

Figure 8C:
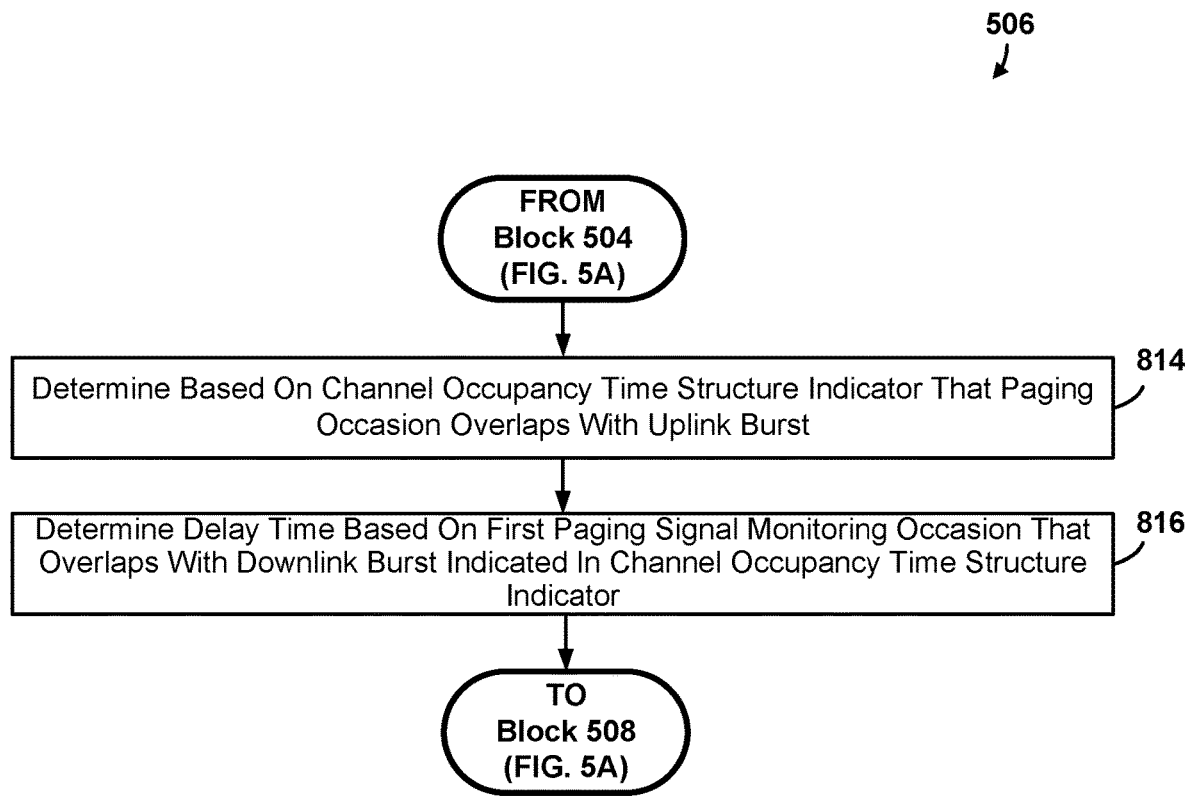

Referring to FIG. 8C, in some implementations following the operations of block 504 (FIG. 5A), the processor may determine based on the channel occupancy time structure indicator that a paging occasion overlaps with an uplink burst in block 814.

In block 816, the processor may determine the delay time based on a first paging signal monitoring occasion that overlaps with a downlink burst indicated in the channel occupancy time structure indicator. Alternatively, the processor may not consider paging signal monitoring occasions that overlap with the uplink burst to determine the delay time. In some implementations, the processor may determine not to monitor paging signal monitoring occasions that overlap with the uplink burst.

The processor may then perform the operations of block 508 (FIG. 5A).

Figure 8D:
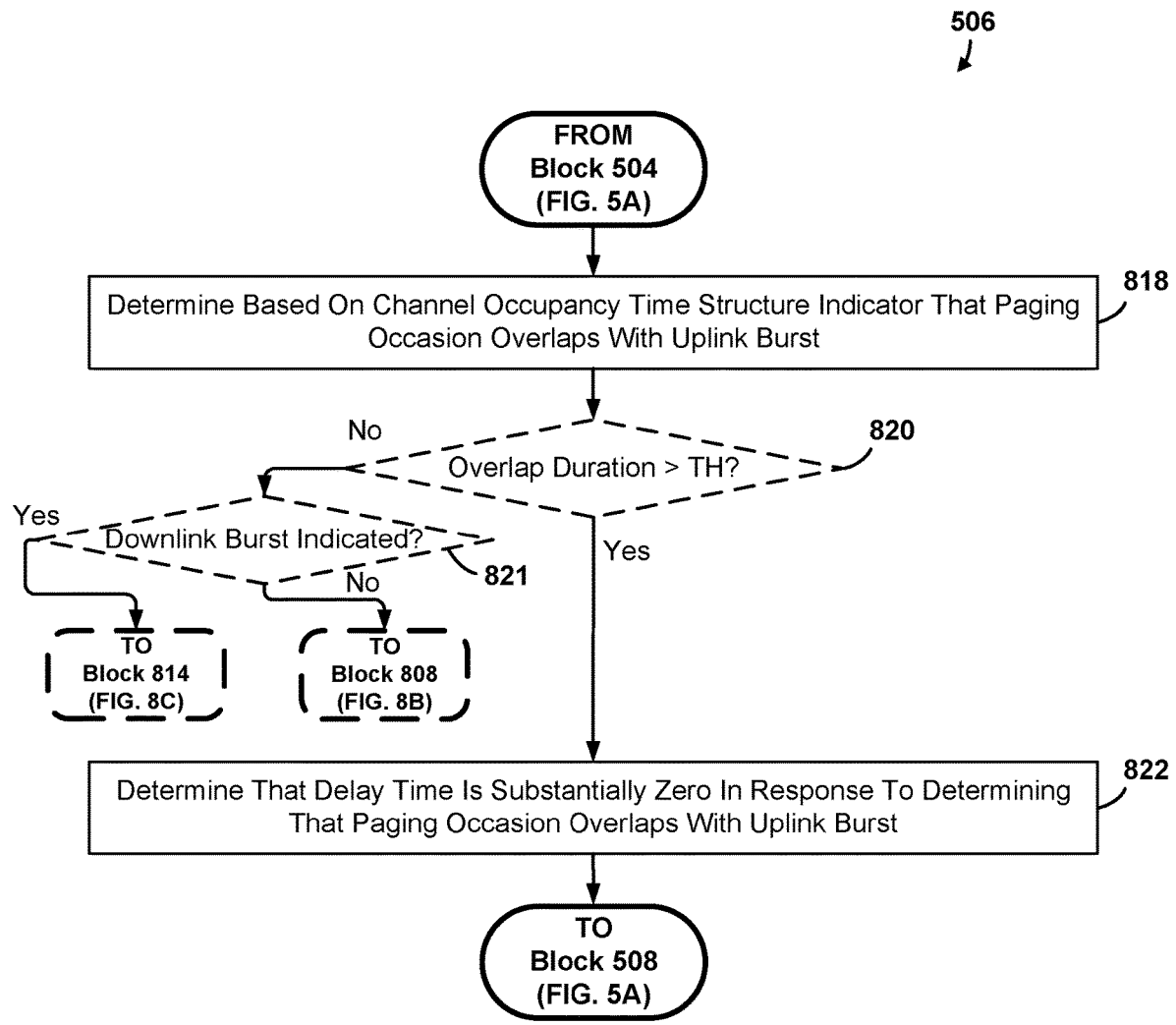

Referring to FIG. 8D, in some implementations following the operations of block 504 (FIG. 5A), the processor may determine based on the channel occupancy time structure indicator that a paging occasion overlaps with an uplink burst in block 818.

In optional block 820, the processor may determine whether a duration of the overlap is greater than a threshold.

In response to determining that the duration of the overlap is not greater than the threshold (i.e., optional determination block 820="No"), the processor may determine whether the channel occupancy time structure indicator indicates a downlink burst in optional determination block 821.

In response to determining that the channel occupancy time structure indicator does not indicate a downlink burst (i.e., optional determination block 821="No"), the processor may perform the operations of block 808 (FIG. 8B).

In response to determining that the channel occupancy time structure indicator does indicate a downlink burst (i.e., optional determination block 821="Yes"), the processor may perform the operations of block 814 (FIG. 8C).

In some implementations, the processor may perform the operations of block 808 in response to determining that the duration of the overlap is not greater than the threshold (i.e., optional determination block 820="No"). In some implementations, the processor may perform the operations of block 814 in response to determining that the duration of the overlap is not greater than the threshold (i.e., optional determination block 820="No").

Following the operations of block 818, or optionally in response to determining that the overlap is greater than the threshold (i.e., optional determination block 820="Yes"), the processor may determine that the delay time is substantially zero in response to determining that the paging occasion overlaps with the uplink burst in block 822.

In some implementations, the value of the threshold may be substantially zero, and the processor may determine that the delay time is substantially zero in response to determining that the paging occasion overlaps with the uplink burst in block 822.

The processor may then perform the operations of block 508 (FIG. 5A).

Figure 8E:
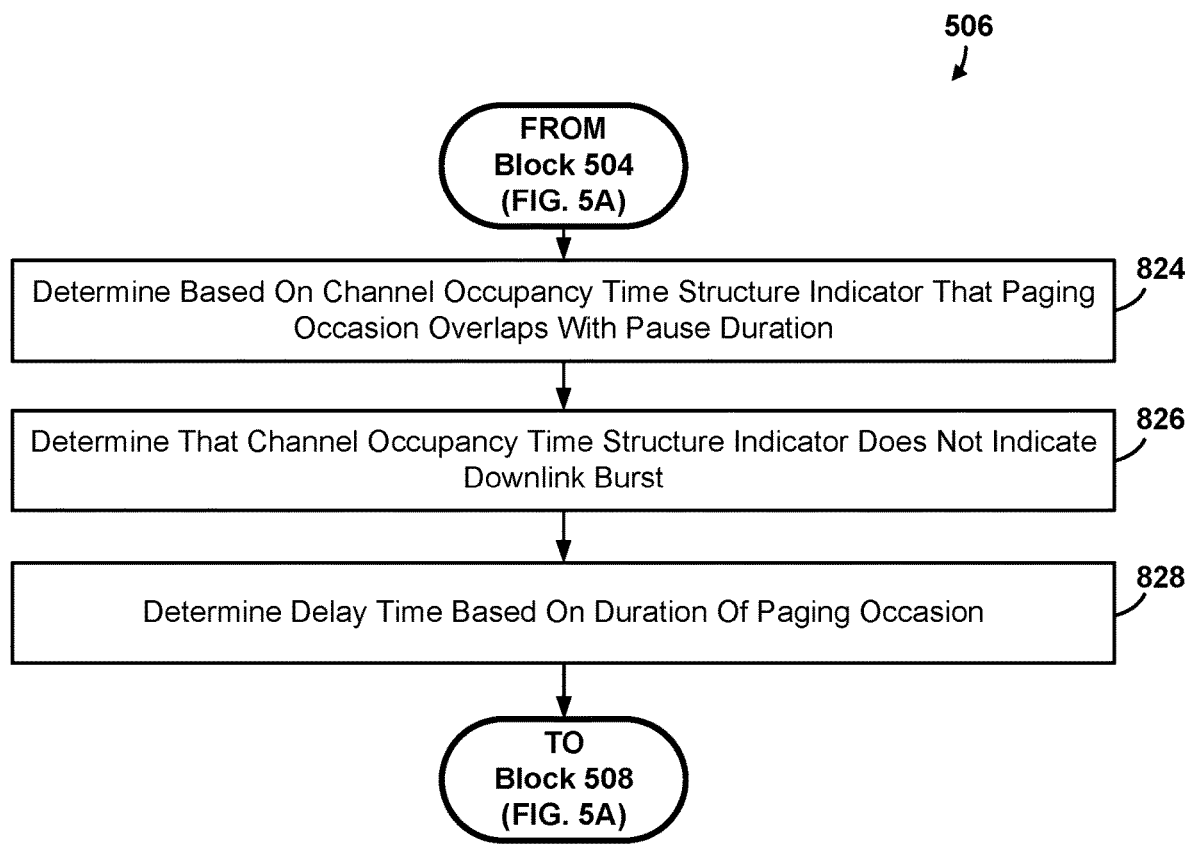

Referring to FIG. 8E, in some implementations following the operations of block 504 (FIG. 5A), the processor may determine based on the channel occupancy time structure indicator that a paging occasion overlaps with a pause duration in block 824.

In block 826, the processor may determine that the channel occupancy time structure indicator does not indicate a downlink burst.

In block 828, the processor may determine the delay time based on a duration of the paging occasion. In some implementations, the processor may determine not to monitor paging signal monitoring occasions that overlap with the pause duration. In some aspects, processor may determine the delay time based on the duration of the paging occasion even if the channel occupancy structure indicates a downlink burst.

The processor may then perform the operations of block 508 (FIG. 5A).

Figure 8F:
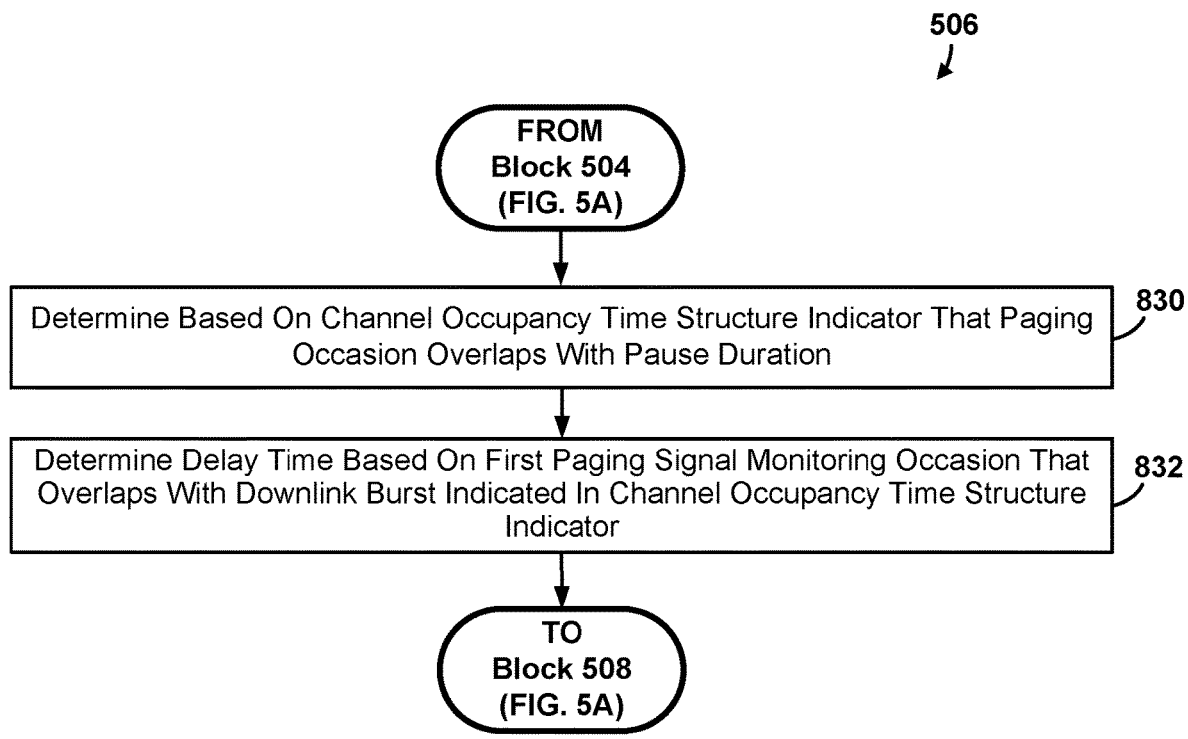

Referring to FIG. 8F, in some implementations following the operations of block 504 (FIG. 5A), the processor may perform operations including determining based on the channel occupancy time structure indicator that a paging occasion overlaps with a pause duration in block 830.

In block 832, the processor may perform operations including determining the delay time based on a first paging signal monitoring occasion that overlaps with a downlink burst indicated in the channel occupancy time structure indicator. Alternatively, the processor may not consider paging signal monitoring occasions that overlap with the pause duration to determine the delay time. In some implementations, the processor may determine not to monitor paging signal monitoring occasions that overlap with the pause duration.

The processor may then perform the operations of block 508 (FIG. 5A).

Figure 8G:
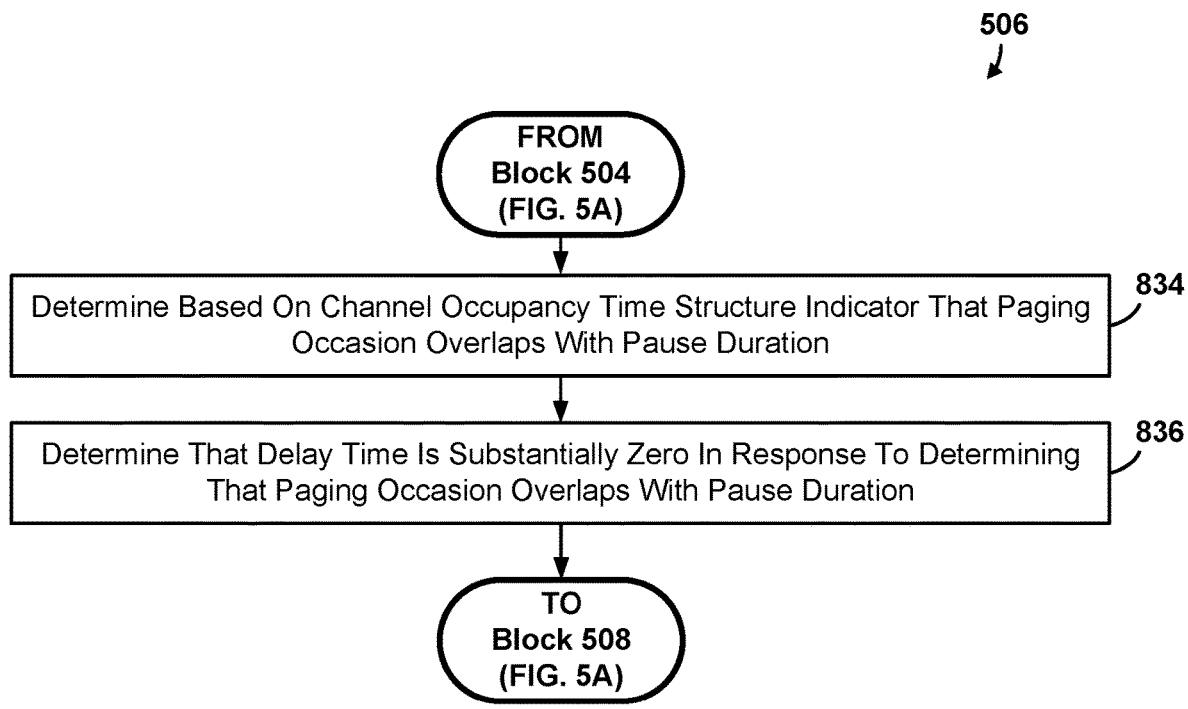

Referring to FIG. 8G, in some implementations following the operations of block 504 (FIG. 5A), the processor may determine based on the channel occupancy time structure indicator that a paging occasion overlaps with a pause duration in block 834.

In block 836, the processor may determine that the delay time is substantially zero in response to determining that the paging occasion overlaps with the pause duration.

The processor may then perform the operations of block 508 (FIG. 5A).

Figure 8H:
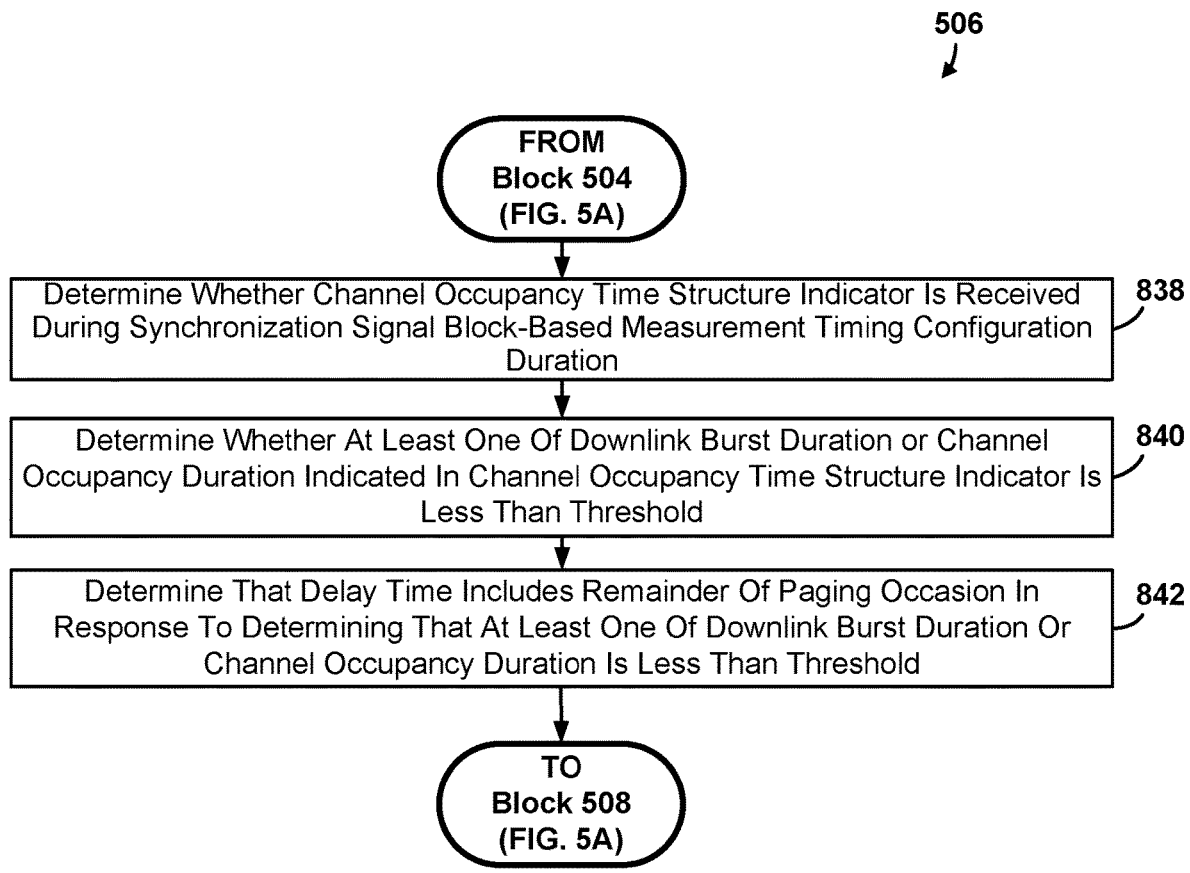

Referring to FIG. 8H, in some implementations following the operations of block 504 (FIG. 5A), the processor may determine whether the channel occupancy time structure indicator is received during a synchronization signal block-based measurement timing configuration duration in block 838.

In block 840, the processor may determine whether at least one of a downlink burst duration or a channel occupancy time duration indicated in the channel occupancy time structure indicator is less than a threshold.

In block 842, the processor may determine that the delay time includes the remainder of a paging occasion in response to determining that at least one of the downlink burst duration or the channel occupancy time duration is less than the threshold.

In some implementations, the value of the threshold may be substantially zero. In some implementations, the value of the threshold may be based on a number of SSB beams, such as the number of SSB beams provided by the base station.

The processor may then perform the operations of block 508 (FIG. 5A).

Figure 8I:
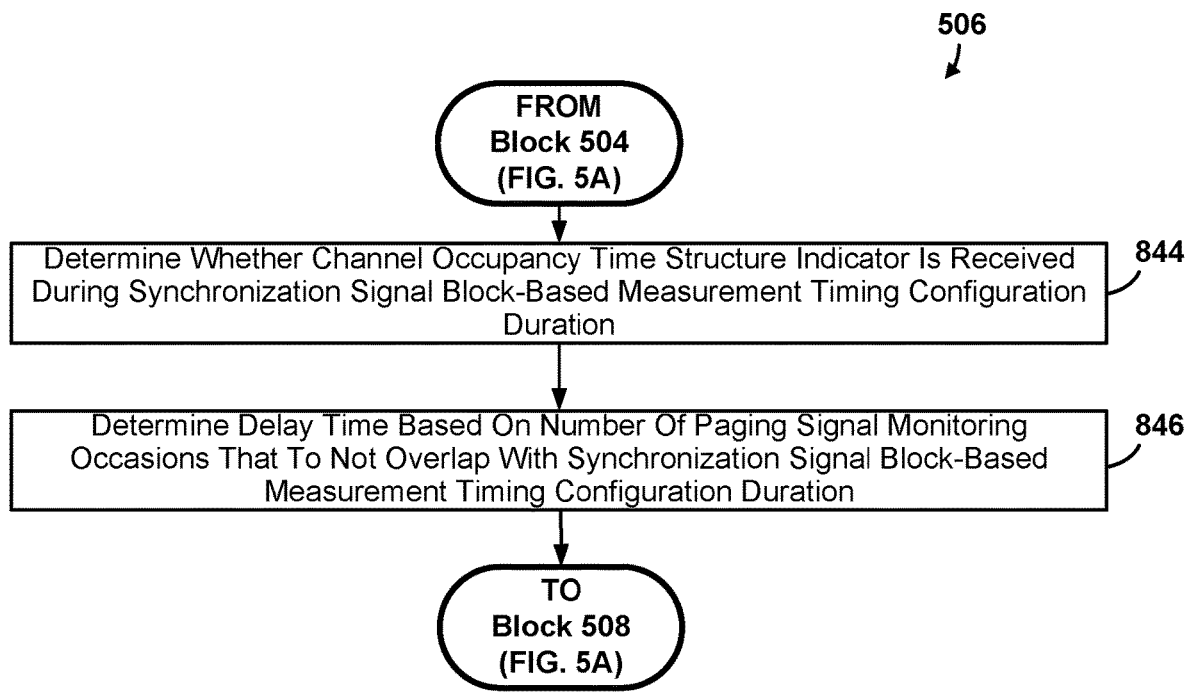

Referring to FIG. 8I, in some implementations following the operations of block 504 (FIG. 5A), the processor may determine whether the channel occupancy time structure indicator is received during a synchronization signal block-based measurement timing configuration duration in block 844.

In block 846, the processor may determine the delay time based on a number of paging signal monitoring occasions that do not overlap with the synchronization signal block-based measurement timing configuration duration. In some implementations, the processor may monitor paging signal monitoring occasions that overlap with the synchronization signal block-based measurement timing configuration duration.

The processor may then perform the operations of block 508 (FIG. 5A).

Figure 8J:
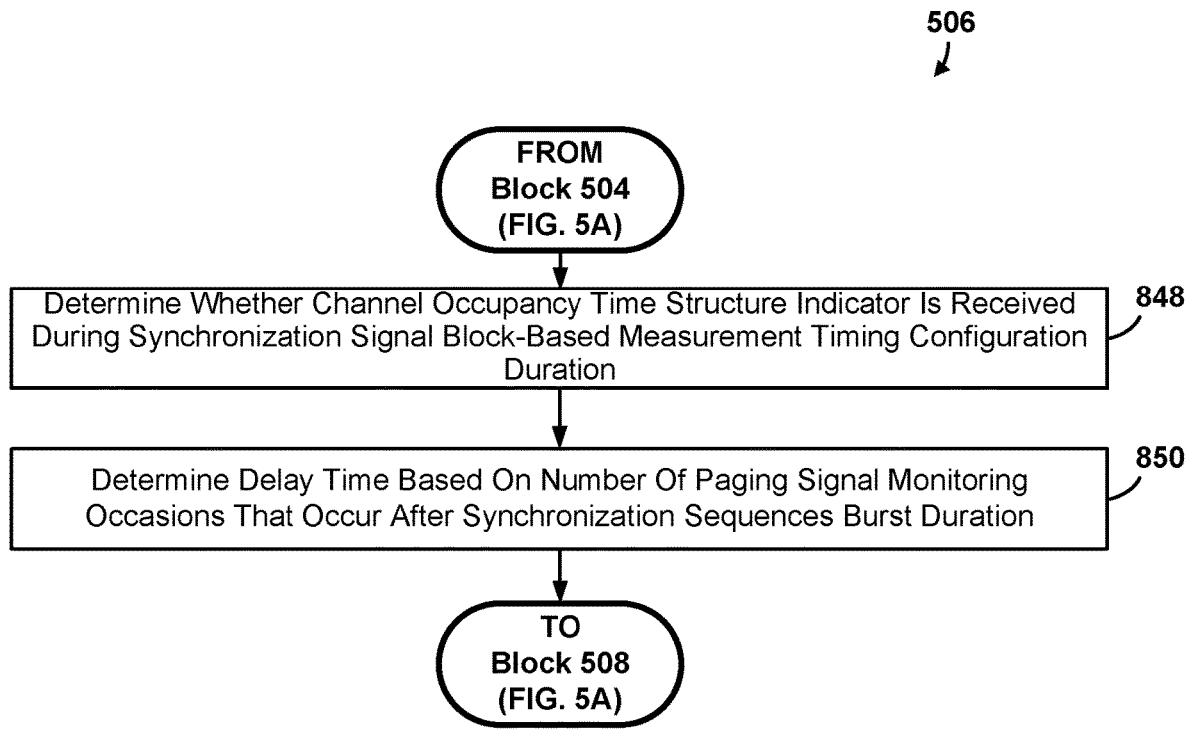

Referring to FIG. 8J, in some implementations following the operations of block 504 (FIG. 5A), in block 848, the processor may determine whether the channel occupancy time structure indicator is received during a synchronization signal block-based measurement timing configuration duration.

In block 850, the processor may determine the delay time based on a number of paging signal monitoring occasions that occur after a synchronization sequences burst duration. In some implementations, the processor may monitor paging signal monitoring occasions that overlap with the synchronization signal block-based measurement timing configuration duration. In some implementations, the processor may determine the synchronization sequences burst duration based on the time duration to transmit SSBs corresponding to all the downlink beams of the serving cell. For example, if a serving cell has four downlink beams and two beams can be transmitted per slot, then the synchronization sequences burst duration includes two slots.

The processor may then perform the operations of block 508 (FIG. 5A).

Figure 8K:
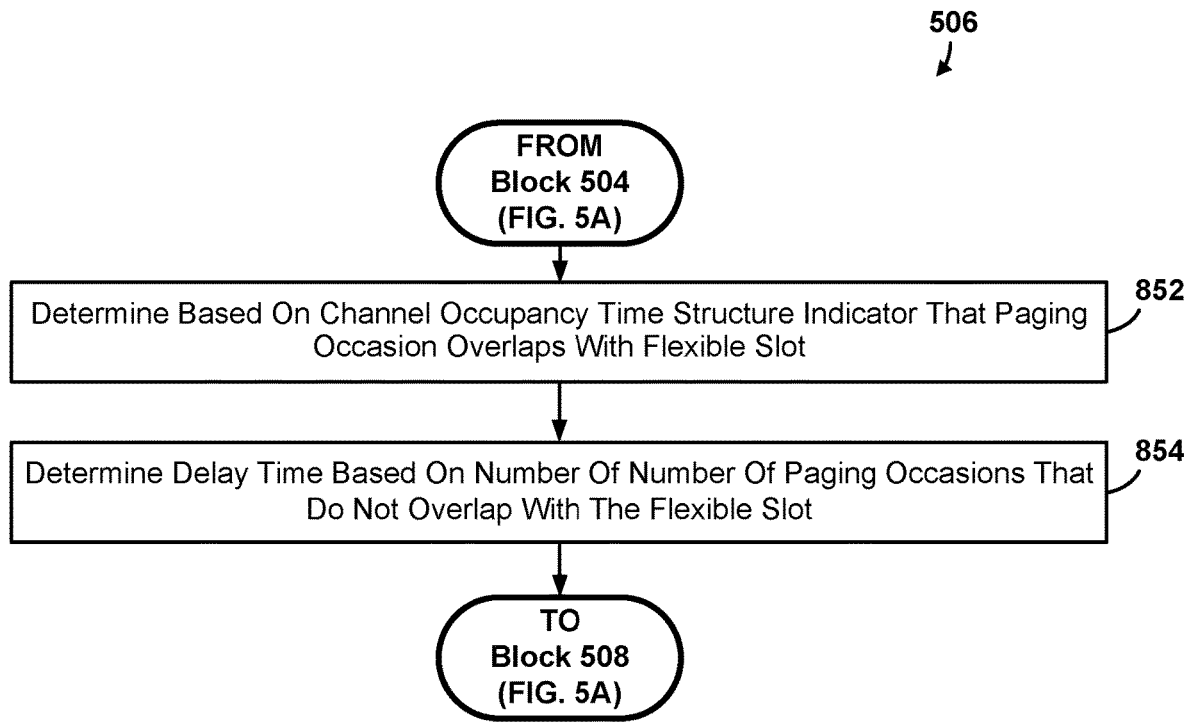

Referring to FIG. 8K, in some implementations following the operations of block 504 (FIG. 5A), in block 852, the processor may determine based on the channel occupancy time structure indicator that a paging occasion overlaps with a flexible slot.

In block 854, the processor may determine the delay time based on a number of paging occasions that do not overlap with the flexible slot. In some implementations, the processor may monitor paging signal occasions that overlap with the flexible slot. In some implementations, the processor may consider paging signal monitoring occasions which overlap with flexible slot to determine the delay time. In some implementations, the processor may not monitor paging signal occasions that overlap with the flexible slot. In some implementations, the processor may not consider paging signal monitoring occasions which overlap with flexible slot to determine the delay time. For example, the processor may determine that the delay time is N paging signal monitoring occasions, and the processor may not consider the paging signal monitoring occasions which overlap with flexible slot as part of N paging signal monitoring occasions.

The processor may then perform the operations of block 508 (FIG. 5A).

Figure 8L:
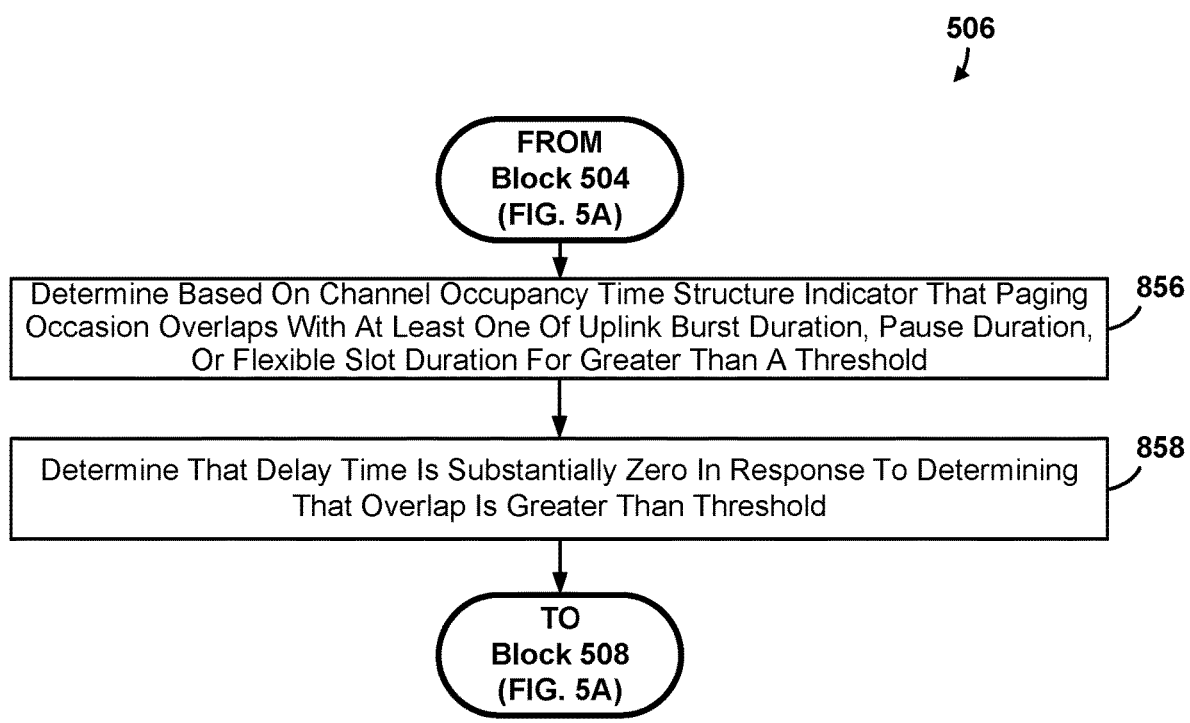

Referring to FIG. 8L, in some implementations following the operations of block 504 (FIG. 5A), in block 856, the processor may determine whether a paging occasion overlaps with at least one of an uplink burst duration, a pause duration, or a flexible slot duration for greater than a threshold. In some implementations, the threshold may be a number of time units (such as a number of milliseconds). In some implementations, the threshold may be a number of paging signal monitoring occasions (such as PDCCH monitoring occasions). Other threshold types also may be possible.

In block 858, the processor may determine that the delay time is substantially zero in response to determining that the overlap is greater than the threshold.

The processor may then perform the operations of block 508 (FIG. 5A).

Figure 8M:
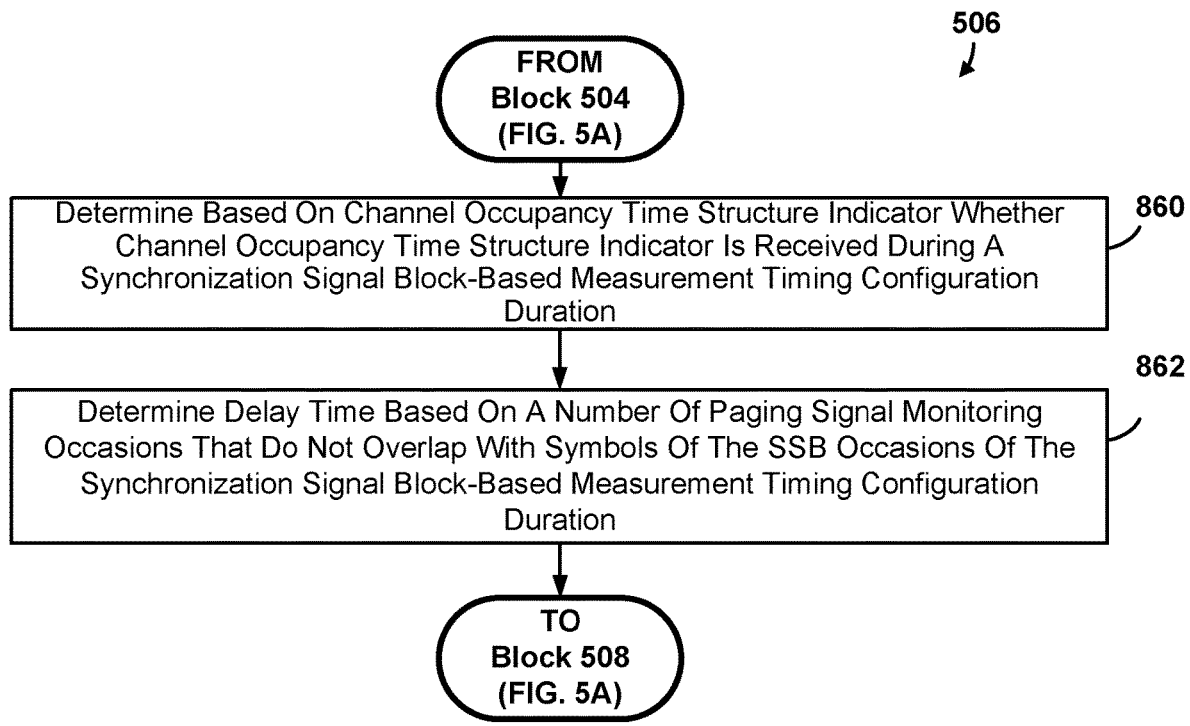

Referring to FIG. 8M, in some implementations following the operations of block 504 (FIG. 5A), in block 860, the processor may determine whether the channel occupancy time structure indicator is received during a synchronization signal block-based measurement timing configuration duration.

In block 862, the processor may determine the delay time based on a number of paging signal monitoring occasions that do not overlap with symbols of synchronization signal block occasions of the synchronization signal block-based measurement timing configuration duration. In some implementations, the processor may monitor paging signal monitoring occasions that overlap with symbols of the synchronization signal block occasion of the synchronization signal block-based measurement timing configuration duration.

The processor may then perform the operations of block 508 (FIG. 5A).

Figure 9:
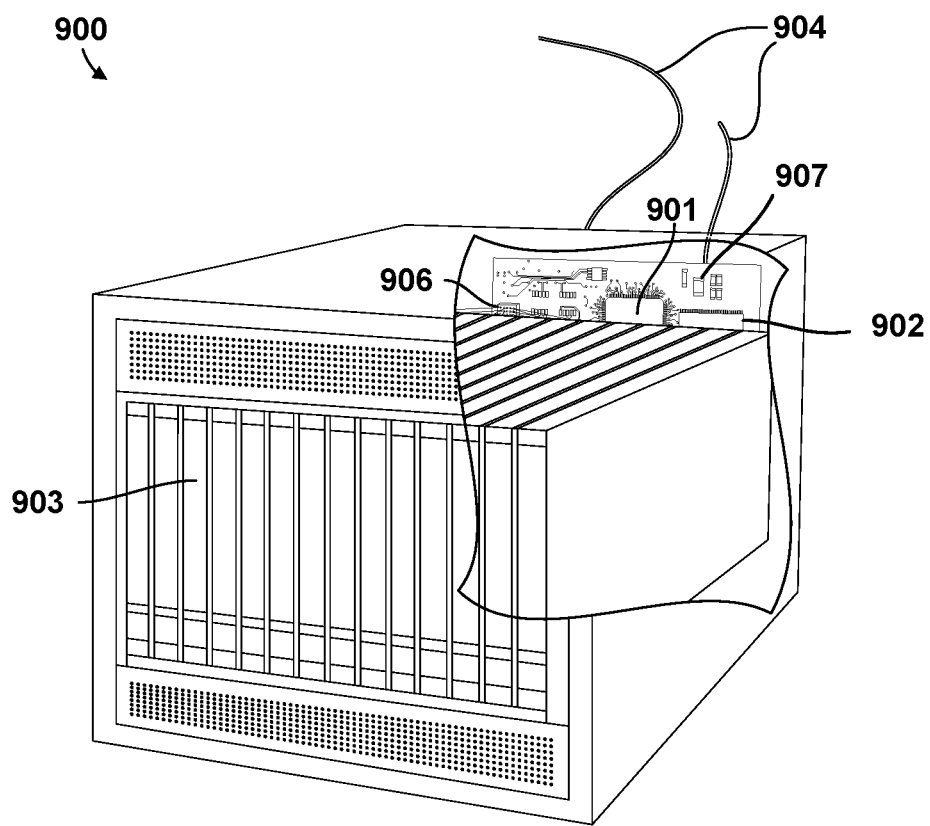
FIG. 9 shows a component block diagram of an example network computing device.

FIG. 9 shows a component block diagram of an example network computing device 900, such as a base station, suitable for use in various implementations. Such network computing devices may include at least the components illustrated in FIG. 9. With reference to FIGS. 1-9, the network computing device 900 may typically include a processor 901 coupled to volatile memory 902 and a large capacity nonvolatile memory, such as a disk drive 903. The network computing device 900 also may include a peripheral memory access device such as a floppy disc drive, compact disc (CD) or digital video disc (DVD) drive 906 coupled to the processor 901. The network computing device 900 also may include network access ports 904 (or interfaces) coupled to the processor 901 for establishing data connections with a network, such as the Internet or a local area network coupled to other system computers and servers. The network computing device 900 may include one or more antennas 907 for sending and receiving electromagnetic radiation that may be connected to a wireless communication link. The network computing device 900 may include additional access ports, such as USB, Firewire, Thunderbolt, and the like for coupling to peripherals, external memory, or other devices.

Figure 10:
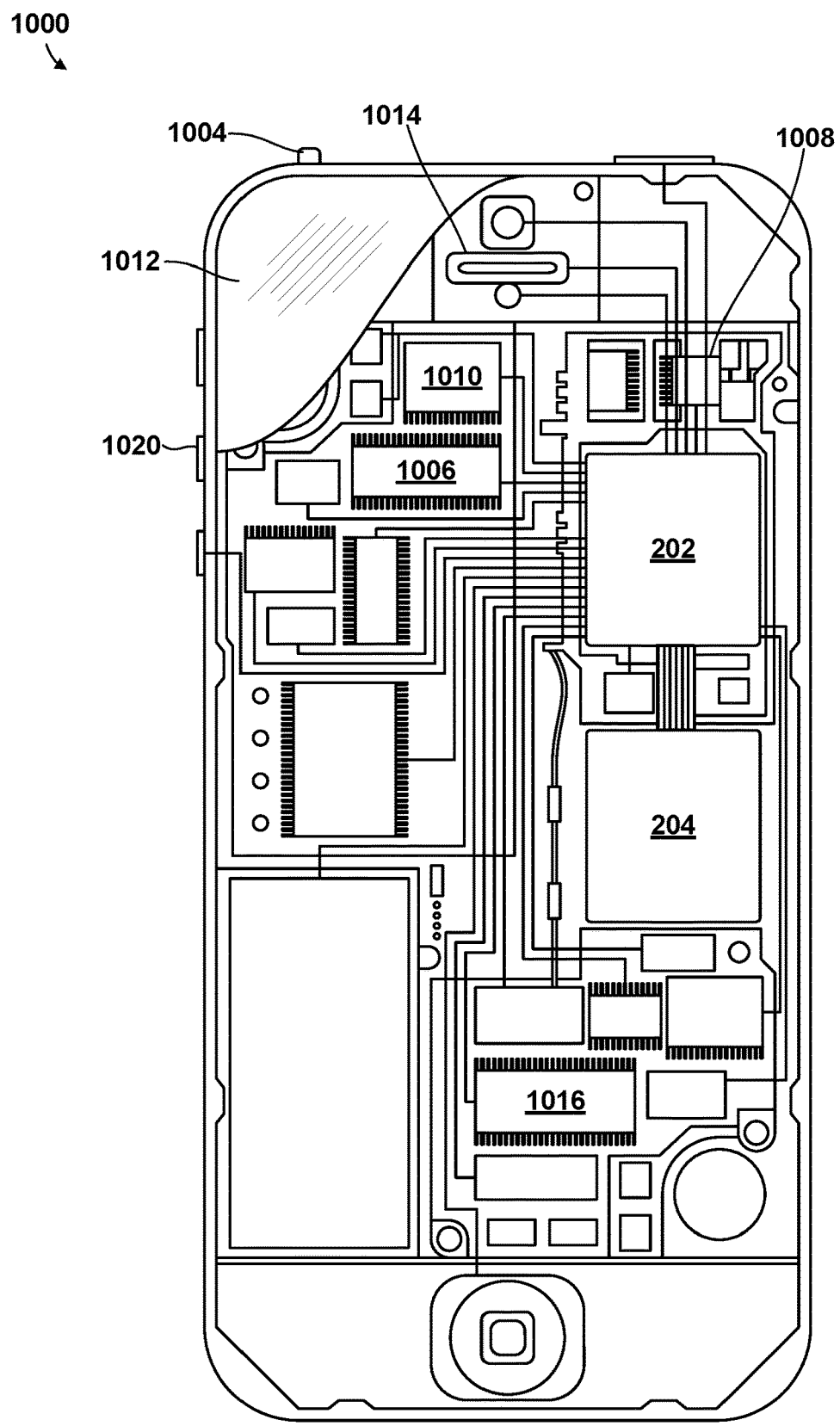
FIG. 10 shows a component block diagram of an example wireless device.

FIG. 10 shows a component block diagram of an example wireless device 1000 suitable for use in various implementations. In various implementations, the wireless device 1000 may be similar to the wireless devices 120, 200, and 320 shown in FIGS. 1-3. A wireless device 1000 may include a first SOC 202 (such as a SOC-CPU) coupled to a second SOC 204 (such as a 5G capable SOC). The first and second SOCs 202, 204 may be coupled to internal memory 1006, 1016, a display 1012, and to a speaker 1014. Additionally, a wireless device 1000 may include an antenna 1004 for sending and receiving electromagnetic radiation that may be connected to a wireless data link or cellular telephone transceiver 1008 coupled to one or more processors in the first or second SOCs 202, 204. A wireless device 1000 typically also includes menu selection buttons or rocker switches 1020 for receiving user inputs.

A wireless device 1000 also includes a sound encoding/decoding (CODEC) circuit 1010, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 1008 and CODEC 1010 may include a digital signal processor (DSP) circuit (not shown separately).

The processors of a network computing device 900 and a wireless device 1000 may be any programmable microprocessor, microcomputer or multiple processor chip or chips that can be configured by software instructions (applications) to perform a variety of functions, including the functions of the various implementations described below. In some mobile devices, multiple processors may be provided, such as one processor within an SOC 204 dedicated to wireless communication functions and one processor within an SOC 202 dedicated to running other applications. Typically, software applications may be stored in the memory 1006, 1016 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various implementations. Such services and standards include, such as third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (such as cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, or content messages. It should be understood that any references to terminology or technical details related to an individual telecommunication standard or technology are for illustrative purposes only, and are not intended to limit the scope of the claims to a particular communication system or technology unless specifically recited in the claim language.

Various implementations provide improved methods, systems, and devices for securing communications in a communication system, and in particular communications between a base station and a wireless device. Various implementations provide improved methods, systems, and devices for protecting physical layer signaling in a communication system, such as the signals provided in the PDCCH and PDSCH.

Various implementations enable a wireless device to reduce the occurrence of mobile terminated call procedure failures. Various implementations provide improvements in the functioning of the wireless device as well as in the functioning of the communication system in which the wireless device operates.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a non-transitory processor-readable storage media for execution by, or to control the operation of, data processing apparatus.

If implemented in software, the functions of various implementations may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available non-transitory storage media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

In one or more aspects, the functions described may be implemented by a processor, which may be coupled to a memory. The memory may be a non-transitory computer-readable storage medium that stores processor-executable instructions. The memory may store an operating system, user application software, or other executable instructions. The memory also may store application data, such as an array data structure. The processor may read and write information to and from the memory. The memory also may store instructions associated with one or more protocol stacks. A protocol stack generally includes computer executable instructions to enable communication using a radio access protocol or communication protocol.

The term "component" is intended to include a computer-related part, functionality or entity, such as, but not limited to, hardware, firmware, a combination of hardware and software, software, or software in execution, that is configured to perform particular operations or functions. For example, a component may be, but is not limited to, a process running on a processor, a processor, an object, an executable, a thread of execution, a program, or a computer. By way of illustration, both an application running on a computing device and the computing device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other computer, processor, or process related communication methodologies.

Various modifications to the implementations described in this disclosure may be readily apparent to those skilled in the art, and the generic principles defined herein may be applied to other implementations without departing from the scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of managing paging monitoring by an apparatus of a wireless device, comprising:
   receiving a serving cell signal from a cell;
   determining a delay time based on the serving cell signal, comprising
      receiving in the serving cell signal a channel occupancy time (COT) structure indicator; and
      determining the delay time in response to receiving in the serving cell signal the COT structure indicator;
   monitoring for a paging signal during the determined delay time; and
   stopping the monitoring for the paging signal upon or after expiration of the determined delay time.

2. The method of claim 1, wherein receiving the serving cell signal from the cell comprises receiving an indication of multiple paging signal monitoring occasions from the cell.

3. The method of claim 2, wherein receiving the indication of multiple paging signal monitoring occasions from the cell comprises receiving an indication from the cell of a number of synchronization signal blocks (SSBs) to be transmitted from the cell and a number of physical downlink control channel (PDCCH) monitoring occasions per SSB in a paging occasion.

4. The method of claim 1, wherein determining the delay time based on the serving cell signal comprises:
   determining a number of paging signal monitoring occasions based on the serving cell signal; and
   determining the delay time based on the determined number of paging signal monitoring occasions.

5. The method of claim 1, wherein determining the delay time based on the serving cell signal comprises:
   identifying a type of the serving cell signal received from the cell; and
   determining the delay time based on the type of the serving cell signal.

6. The method of claim 1, wherein determining the delay time based on the serving cell signal comprises:
   determining that the serving cell signal comprises paging control information; and
   determining the delay time based on the determination that the serving cell signal comprises paging control information.

7. The method of claim 1, wherein determining the delay time based on the determination that the serving cell signal comprises the COT structure indicator comprises:
   determining whether an overlap of a remaining COT duration with a paging occasion is less than a threshold; and
   determining that the delay time comprises an end of the paging occasion in response to determining that the overlap is less than the threshold; or
   determining that the delay time comprises the remaining COT duration in response to determining that the overlap is not less than the threshold.

8. The method of claim 1, wherein determining the delay time based on the serving cell signal comprises:
   determining, based on the COT structure indicator, that a paging occasion overlaps with an uplink burst;
   determining that the COT structure indicator does not indicate a downlink burst; and
   determining the delay time based on a duration of the paging occasion.

9. The method of claim 1, wherein determining the delay time based on the serving cell signal comprises:
   determining, based on the COT structure indicator, that a paging occasion overlaps with an uplink burst; and
   determining the delay time based on a first paging signal monitoring occasion that overlaps with a downlink burst indicated in the COT structure indicator.

10. The method of claim 1, wherein determining the delay time based on the serving cell signal comprises:
    determining, based on the COT structure indicator, that a paging occasion overlaps with an uplink burst; and
    determining that the delay time is substantially zero in response to determining that the paging occasion overlaps with the uplink burst.

11. The method of claim 1, wherein determining the delay time based on the determination that the serving cell signal comprises the COT structure indicator comprises:
    determining whether the COT structure indicator is received during a synchronization signal block (SSB)-based measurement timing configuration duration;
    determining whether overlap of a downlink burst duration or channel occupancy duration with the SSB-based measurement timing configuration duration indicated in the COT structure indicator is less than a threshold; and
    determining that the delay time comprises a remainder of a paging occasion in response to determining that overlap of the downlink burst duration or channel occupancy duration with the SSB-based measurement timing configuration duration is less than the threshold.

12. The method of claim 1, wherein determining the delay time based on the determination that the serving cell signal comprises the COT structure indicator comprises:
    determining whether the COT structure indicator is received during an SSB-based measurement timing configuration duration; and
    determining the delay time based on a number of paging signal monitoring occasions that to not overlap with the SSB-based measurement timing configuration duration.

13. The method of claim 1, wherein determining the delay time based on the determination that the serving cell signal comprises the COT structure indicator comprises:
    determining whether the COT structure indicator is received during a SSB-based measurement timing configuration duration; and
    determining the delay time based on a number of paging signal monitoring occasions that occur after a synchronization sequences burst.

14. The method of claim 1, wherein stopping the monitoring for the paging signal upon or after expiration of the determined delay time comprises:
  receiving from the cell a message indicating that the wireless device may stop monitoring for the paging signal; and
  stopping the monitoring for the paging signal in response to receiving the message indicating that the wireless device may stop monitoring for the paging signal.

15. The method of claim 14, wherein the message indicating that the wireless device may stop monitoring for the paging signal comprises a Paging-Radio Network Temporary Identifier (P-RNTI) message.

16. The method of claim 14, wherein stopping the monitoring for the paging signal in response to receiving the message indicating that the wireless device may stop monitoring for the paging signal comprises stopping the monitoring for the paging signal in one or more PDCCH monitoring occasions in response to receiving the message indicating that the wireless device may stop monitoring for the paging signal.

17. A method of managing paging monitoring by an apparatus of a wireless device, comprising:
  receiving a serving cell signal from a cell;
  determining a delay time based on the serving cell signal, comprising
    selecting, based on the serving cell signal, a number of paging signal monitoring occasions; and
    determining the delay time based on the selected number of paging signal monitoring occasions;
  monitoring for a paging signal during the determined delay time; and
  stopping the monitoring for the paging signal upon or after expiration of the determined delay time.

18. An apparatus of a wireless device, comprising:
  a first interface configured to obtain a serving cell signal from a cell; and
  a processing system coupled to the first interface and configured to:
    receive in the serving cell signal a channel occupancy time (COT) structure indicator;
    determine the delay time in response to receiving in the serving cell signal the COT structure indicator;
    monitor for a paging signal during the determined delay time; and
    stop the monitoring for the paging signal upon or after expiration of the determined delay time.

19. The apparatus of claim 18, wherein the first interface is further configured to obtain an indication of multiple paging signal monitoring occasions from the cell.

20. The apparatus of claim 19, wherein the first interface is further configured to obtain an indication from the cell of a number of synchronization signal blocks (SSBs) to be transmitted from the cell and a number of physical downlink control channel (PDCCH) monitoring occasions per SSB in a paging occasion.

21. The apparatus of claim 18, wherein the processing system is further configured to:
  determine a number of paging signal monitoring occasions based on the serving cell signal; and
  determine the delay time based on the determined number of paging signal monitoring occasions.

22. The apparatus of claim 18, wherein the processing system is further configured to:
  identify a type of the serving cell signal received from the cell; and
  determine the delay time based on the type of the serving cell signal.

23. The apparatus of claim 18, wherein the processing system is further configured to:
  determine that the serving cell signal comprises paging control information; and
  determine the delay time based on the determination that the serving cell signal comprises paging control information.

24. The apparatus of claim 18, wherein the processing system is further configured to:
  determine whether an overlap of a remaining COT duration with a paging occasion is less than a threshold; and
  determine that the delay time comprises an end of the paging occasion in response to determining that the overlap is less than the threshold; or
  determine that the delay time comprises the remaining COT duration in response to determining that the overlap is not less than the threshold.

25. The apparatus of claim 18, wherein the processing system is further configured to:
  determine based on the COT structure indicator that a paging occasion overlaps with an uplink burst;
  determine that the COT structure indicator does not indicate a downlink burst; and
  determine the delay time based on a duration of the paging occasion.

26. The apparatus of claim 18, wherein the processing system is further configured to:
  determine based on the COT structure indicator that a paging occasion overlaps with an uplink burst; and
  determine the delay time based on a first paging signal monitoring occasion that overlaps with a downlink burst indicated in the COT structure indicator.

27. The apparatus of claim 18, wherein the processing system is further configured to:
  determine based on the COT structure indicator that a paging occasion overlaps with an uplink burst; and
  determine that the delay time is substantially zero in response to determining that the paging occasion overlaps with the uplink burst.

28. The apparatus of claim 18, wherein the processing system is further configured to:
  determine whether the COT structure indicator is received during a synchronization signal block (SSB)-based measurement timing configuration duration;
  determine whether overlap of a downlink burst duration or channel occupancy duration with the SSB-based measurement timing configuration duration indicated in the COT structure indicator is less than a threshold; and
  determine that the delay time comprises a remainder of a paging occasion in response to determining that overlap of the downlink burst duration or channel occupancy duration with the SSB-based measurement timing configuration duration is less than the threshold.

29. The apparatus of claim 18, wherein the processing system is further configured to:
  determine whether the COT structure indicator is received during an SSB-based measurement timing configuration duration; and
  determine the delay time based on a number of paging signal monitoring occasions that to not overlap with the SSB-based measurement timing configuration duration.

30. The apparatus of claim 18, wherein the processing system is further configured to:

determine whether the COT structure indicator is received during an SSB-based measurement timing configuration duration; and determine the delay time based on a number of paging signal monitoring occasions that occur after a synchronization sequences burst.

31. The apparatus of claim 18, wherein the processing system is further configured to:

receive from the cell a message indicating that the wireless device may stop monitoring for the paging signal; and stop the monitoring for the paging signal in response to receiving the message indicating that the wireless device may stop monitoring for the paging signal.

32. The method of claim 31, wherein the message indicating that the wireless device may stop monitoring for the paging signal comprises a Paging-Radio Network Temporary Identifier (P-RNTI) message.

33. The method of claim 31, wherein the processing system is further configured to stop the monitoring for the paging signal in one or more PDCCH monitoring occasions in response to receiving the message indicating that the wireless device may stop monitoring for the paging signal.

34. An apparatus of a wireless device, comprising:

a first interface configured to obtain a serving cell signal from a cell; and a processing system coupled to the first interface and configured to:

select, based on the serving cell signal, a number of paging signal monitoring occasions;

determine the delay time based on the selected number of paging signal monitoring occasions;

monitor for a paging signal during the determined delay time; and stop the monitoring for the paging signal upon or after expiration of the determined delay time.

* * * * *